(12) United States Patent
Grady et al.

(10) Patent No.: US 7,234,787 B2
(45) Date of Patent: Jun. 26, 2007

(54) LIQUID LEVEL DETECTION METHOD AND APPARATUS

(75) Inventors: Timothy T. Grady, Poway, CA (US); Yichuan Pan, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 284 days.

(21) Appl. No.: 10/935,343

(22) Filed: Sep. 7, 2004

(65) Prior Publication Data

US 2005/0151764 A1    Jul. 14, 2005

Related U.S. Application Data

(60) Provisional application No. 60/534,877, filed on Jan. 8, 2004.

(51) Int. Cl.
*B41J 2/195* (2006.01)
(52) U.S. Cl. ............................................. 347/7
(58) Field of Classification Search ...................... 347/7
See application file for complete search history.

(56) References Cited

U.S. PATENT DOCUMENTS

| | | | |
|---|---|---|---|
| 4,193,004 A | 3/1980 | Lobdell et al. | |
| 4,639,738 A | 1/1987 | Young et al. | |
| 4,989,452 A | 2/1991 | Toon et al. | |
| 5,386,224 A | 1/1995 | Deur et al. | |
| 5,616,929 A | 4/1997 | Hara | |
| 5,646,929 A * | 7/1997 | Choi | 369/44.23 |
| 5,682,183 A | 10/1997 | Wade et al. | |
| 5,686,947 A | 11/1997 | Murray et al. | |
| 5,689,290 A | 11/1997 | Saito et al. | |
| 5,757,390 A | 5/1998 | Gragg et al. | |
| 5,997,121 A | 12/1999 | Altfather et al. | |
| 6,012,795 A * | 1/2000 | Saito et al. | 347/7 |
| 6,234,603 B1 | 5/2001 | Altfather et al. | |
| 6,247,775 B1 | 6/2001 | Walker | |

(Continued)

FOREIGN PATENT DOCUMENTS

DE      297 05 889      7/1997

(Continued)

*Primary Examiner*—Stephen Meier
*Assistant Examiner*—Jason Uhlenhake
(74) *Attorney, Agent, or Firm*—Mark G. Bocchetti; Milton S. Sales

(57) ABSTRACT

A sensing system is described for detecting the presence of ink at a predetermined level in an ink reservoir for an ink jet printer. The reservoir includes a perimetric wall having first and second wall sections, wherein at least a portion of said first wall section and a portion of the second wall section are substantially transmissive to light. A light emitter is located proximate to the first wall section and positioned at the predetermined level. A photo detector is positioned at the predetermined level and located proximate to the second wall section for detecting the light emitted from the light emitter, the light emitter being oriented to direct light at the photodetector. The light from the light emitter follows a first path when ink is present in the reservoir at the predetermined level and follows a second path when ink is not present in the reservoir at the predetermined level, the photodetector receiving the light from the light emitter traveling only one of the first path or the second path.

28 Claims, 18 Drawing Sheets

U.S. PATENT DOCUMENTS

| | | |
|---|---|---|
| 6,293,143 B1 | 9/2001 | Denton et al. |
| 6,302,503 B1 | 10/2001 | Seu |
| 6,361,136 B1 | 3/2002 | Watanabe et al. |
| 6,409,302 B2 | 6/2002 | Altfather et al. |
| 6,412,894 B1 | 7/2002 | Askren et al. |
| 6,422,674 B1 | 7/2002 | Hinami et al. |
| 6,431,670 B1 | 8/2002 | Schantz et al. |
| 6,443,546 B1 | 9/2002 | Takagi |
| 6,454,400 B1 | 9/2002 | Morita et al. |
| 6,494,553 B1 * | 12/2002 | Donahue et al. ............... 347/7 |
| 6,520,612 B1 | 2/2003 | Merz et al. |
| 6,554,381 B2 | 4/2003 | Locher et al. |
| 6,554,382 B1 | 4/2003 | Sleger |
| 2001/0035887 A1 | 11/2001 | Altfather et al. |
| 2003/0206219 A1 | 11/2003 | Fellingham et al. |
| 2004/0041859 A1 * | 3/2004 | Hwang ........................ 347/7 |

FOREIGN PATENT DOCUMENTS

| | | |
|---|---|---|
| DE | 102 01 769 | 12/2003 |
| JP | 08014989 A * | 1/1996 .................... 347/7 |

* cited by examiner

A

B

C

D

E

F

LIQUID LEVEL DETECTION METHOD AND APPARATUS

CROSS REFERENCE TO RELATED APPLICATIONS

This is a 111A application of Provisional Application Ser. No. 60/534,877, Filed Jan. 8, 2004, entitled LIQUID LEVEL DETECTION METHOD AND APPARATUS by Timothy T. Grady, et al.

FIELD OF THE INVENTION

The present invention relates generally to detecting the presence of liquid at a predetermined level in a liquid reservoir, and more particularly to detecting the presence of ink at a predetermined level in an ink reservoir for an ink jet printer.

BACKGROUND OF THE INVENTION

Inkjet type printers typically employ a print cartridge that is moved in a transverse fashion across a print media. Contemporary disposable inkjet print cartridges typically include a self-contained ink container, a print head including a plurality of inkjet nozzles in combination with the ink container, and a plurality of external electrical contacts for connecting the inkjet nozzles to driver circuitry in the printer. Failure of a disposable print cartridge is usually related to electrical damages to the resistors used to vaporize the ink and eject droplets from the nozzles. As inkjet technology has improved, the reliability of the print cartridge has improved dramatically. The print head assemblies used in the contemporary disposable inkjet print cartridges are fully operable to their original print quality specifications after printing ink tens or even hundreds of times the volume of the self-contained ink container.

Efforts have been pursued in the inkjet industry to extend the lives of the print cartridges in printers to reduce the cost of operation and to reduce the frequency of cartridge replacement for customers, as well as for environmental reasons. Print cartridge life can be extended by merely making the cartridge container larger in size such that it can hold a larger ink supply. But this approach adds extra weight on the printer carriage, which moves side to side continuously across the media width for image printing. The extra weight on the carriage causes more mechanical stress to the printer structure and demands a larger motor to drive the carriage.

U.S. Pat. No. 5,686,947 to Murray et al., discloses a wide format inkjet printer which provides a substantially continuous supply of ink to a print cartridge from a large, refillable ink reservoir mounted within the printer. Flexible tubing, permanently mounted within the inkjet printer, connects the reservoir to the print cartridge. The off-carriage ink supply allows a print cartridge to function for the full cartridge life while eliminating the problems related to the extra weight on the carriage of an on-carriage large ink supply. An on-carriage ink refill system is provided by U.S. application Ser. No. 10/138,883, filed on May 3, 2002. A replaceable ink container is installed onto the print cartridge. As ink in the print cartridge is depleted from the nozzles, ink in the replaceable ink container is drawn to the cartridge through an anti-siphon tube built inside the container. When the container is about out of ink, it is removed and replaced with a new ink container.

For both ink delivery systems mentioned above, diligence is necessary for the operator of the printer to inspect the refillable ink reservoir or to replace the replaceable ink container, and to ensure that they are not out of ink before refilling or replacement. Running out of ink may result in catastrophic print cartridge failure due to cartridge running dry or image printing failure due to ink starvation. Therefore, it is desirable if the printer can automatically sense the ink presence in the ink delivery system to avoid the failures.

U.S. Pat. No. 5,079,570 by Mohr et al. discloses a transparent vertical ink tube attached to a cartridge housing filled with foam. The capillary effect of the foam to ink causes the tube to be empty of ink when the ink level in the cartridge goes below a certain level. Therefore, the out of ink state can be detected visually or by instrumentation. U.S. Pat. No. 5,386,224 by Deur et al. places an ink level sensing probe into the ink supply tank to sense ink presence through the electrical conductivity of the ink. U.S. Pat. No. 4,639,738, by Young et al. and assigned to the common assignee of the present invention, discloses a detection system which incorporates detection ports in the cartridge for detecting pressure difference in the top and the bottom of the cartridge using a pressure differential sensor that signals a refill condition. U.S. Pat. No. 5,616,929 by Hara discloses an ink tank having an inclined interface, which selectively reflect the incident light from a light source depending on if there is ink presence or no ink presence in the tank. When no ink is present, the incident light is totally reflected and can be visually observed.

The application of a light source is advantageous because the light can be easily sensed automatically and the majority of the sensing components can be made not in contact with ink. U.S. Pat. No. 6,302,503 by Seu discloses a cartridge filled with glass beads. A light source illuminates the beads through a transparent window and a photo sensor records the reflected light. As the ink level drops below the level of the sensor, the recorded intensity of the reflected light shows a difference. U.S. Pat. No. 6,554,381 by Locker et al. provides a reflection body floating in a fluid receptacle. When light from a light source is directed to the reflection body, it is reflected back and received by a light detector. The fluid level causes variable amount of light being detected.

U.S. Pat. No. 5,689,290 by Saito et al. employs a phototransistor to sense the light transmitted through an ink chamber to detect ink presence. Another transmissive sensing system is disclosed in U.S. Pat. No. 6,247,775 by Walker. These transmissive approaches generally rely on the difference of light absorption between ink and air. The light intensity needs to be measured against a threshold to determine the ink presence.

U.S. Pat. No. 5,997,121 by Altfather et al., U.S. Pat. No. 6,234,603 by Altfather et al., U.S. Pat. No. 6,409,302 by Altfather et al., U.S. Pat. No. 6,494,553 by Donahue et al., U.S. Pat. No. 6,520,612 by Merz et al., all assigned to Xerox Corporation, and U.S. application Ser. No. 09/792,980 filed on Feb. 26, 2001 by Altfather et al. from Xerox Corporation involve different applications of an ink sensing apparatus which comprises a light source, a photosensor and a faceted prism inside a transparent wall of an ink container. When the prism is exposed to air, the light directed from the light source to the prism is internally reflected by the facets back to the photosensor. When the prism is immersed in ink, weak light is reflected back to the photosensor.

U.S. Pat. No. 6,361,136 by Watanabe et al. and U.S. Pat. No. 6,443,546 by Takagi, both assigned to Canon Kabushiki Kaisha, also involve faceted prism means for reflecting light to detect ink presence inside the container. The application of a faceted prism magnifies the light signal difference between ink presence and no ink presence in the ink container. Such a sensing system may not be universal to all liquids. For example, a reflective liquid may cause malfunction of sensing.

SUMMARY OF THE INVENTION

It is therefore an object of the invention to provide an ink presence sensing system that is simple in structure and reliable in use. More importantly, the sensing system should generate binary output signal to discriminate the ink presence state from the no ink presence state.

According to one aspect of the invention, an ink sensor assembly comprises a light emitter and a light detector attached to an ink reservoir at a predetermined level to sense the presence of ink inside the reservoir. The reservoir includes a first wall section and a second wall section that forms an angle with the first wall section. At least a portion of the first wall section and a portion of the second wall section are partially or substantially transmissive to light. The light emitter is located proximate to the first wall section, directing light to the light detector which is located proximate to the second wall section. The light from the light emitter enters the first wall section to the internal space of the reservoir and comes out the second wall section. The light is refracted at the outside and the inside surfaces of the first wall section and the second wall section and follows a first path when ink is present in the reservoir and a second path when ink is not present in the reservoir at the predetermined level. The light detector is positioned to receive the light from the light emitter traveling along one of the first path or the second path.

According to another aspect of the invention, the light detector is placed proximate to the second wall section to receive the light from the light emitter when ink is not present in the reservoir at the predetermined level. The embodiment has the advantage of detecting opaque and reflective inks.

According to another aspect of the invention, the sensing system is applied to sense liquid other than inkjet inks.

BRIEF DESCRIPTION OF THE DRAWINGS

These and other objects and features of the invention will become more fully apparent from the following description and appended claims taken in conjunction with the following drawings, where like reference numbers indicate identical or functionally similar elements.

DETAILED DESCRIPTION OF THE INVENTION

The present description will be directed in particular to elements forming part of, or cooperating more directly with, apparatus and methods in accordance with the present invention. It is to be understood that elements not specifically shown or described may take various forms well known to those skilled in the art.

Figure 1:
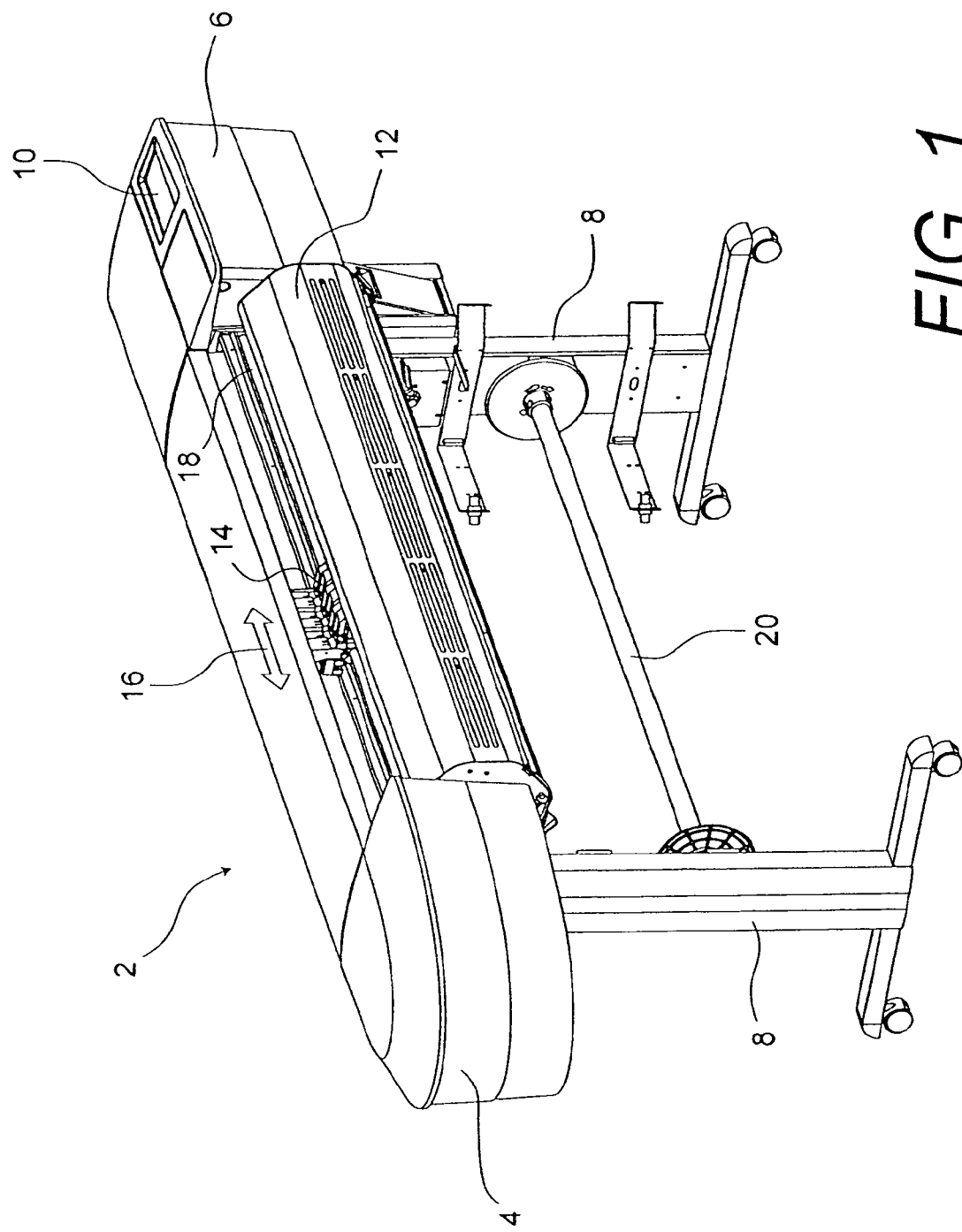
FIG. 1 is a perspective view of a wide format inkjet printer.

Referring to FIG. 1, an example of a wide format inkjet printer 2 is shown including a left side housing 4 and a right side housing 6, and is supported by a pair of legs 8. A wide format, or large format, inkjet printer is typically floor standing. It is capable of printing on media larger than A2 or wider than 17". In contrast, a desk-top, or small format, printer typically prints on media sized 8.5" by 11" or 11" by 17", or the metric standard A4 or A3. The right side housing 6 shown in FIG. 1 has a display with keypad 10 on top for operator input and control, and encloses various electrical and mechanical components, including the main electronic board (not shown) and the service station (not shown), which are related to the operation of the printer, but not directly pertinent to the present invention. The media drying air blower 12, which works with a media heater (not shown)

to drive moisture out of media surface, is also not the focus of the present invention. The left side housing 4 encloses an ink supply station 108 (FIG. 6), which contains large volumes of ink supplies as part of the ink delivery system for the inkjet printer, and will be explained in detail in the subsequent sections.

Figure 2:
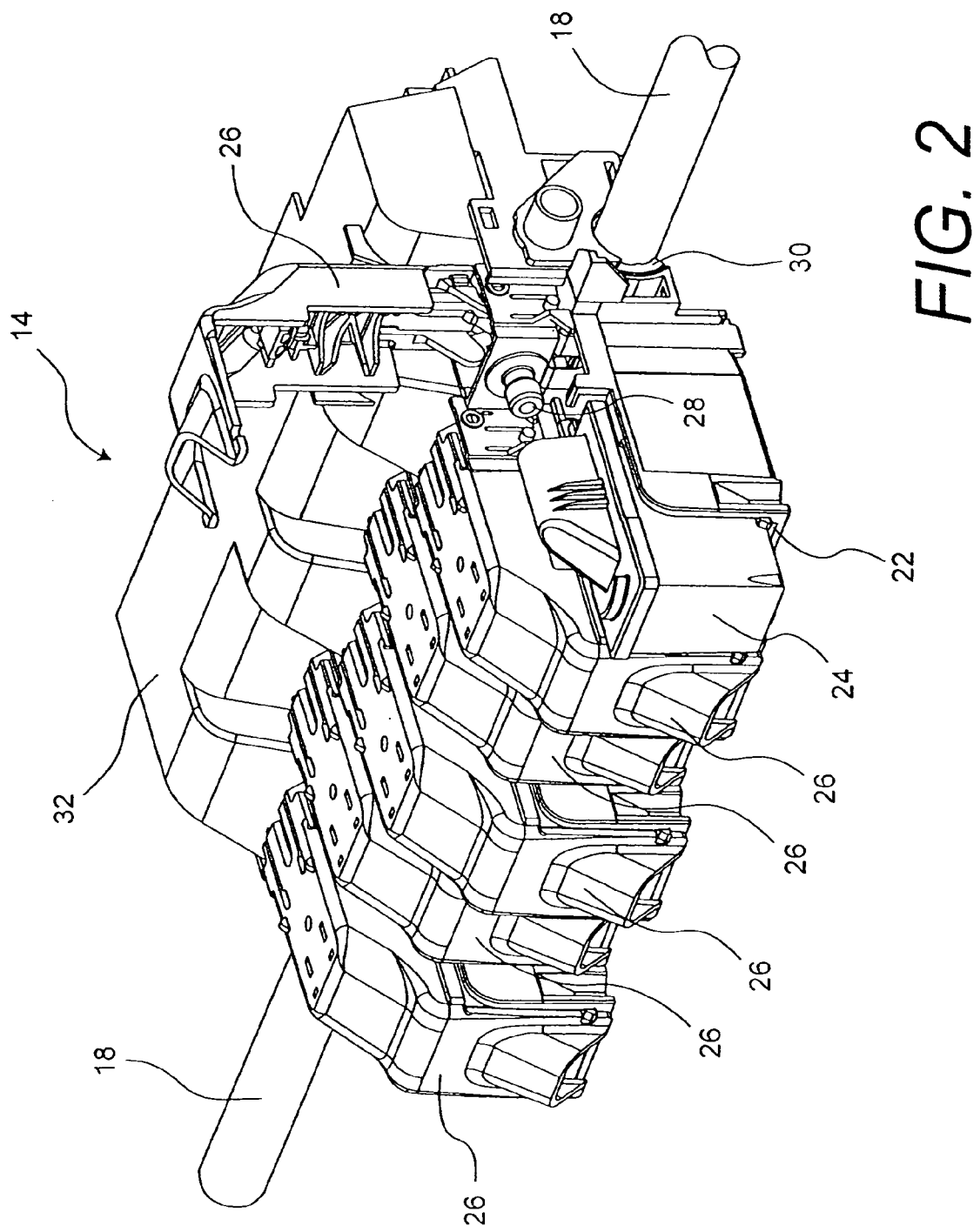
FIG. 2 is a perspective view of a printer carriage assembly in the inkjet printer shown in FIG. 1, with one of the stalls open for receiving a disposable inkjet print cartridge.

As shown in FIG. 1, the carriage 14 rides on a guiding shaft 18 and bi-directionally moves along the scanning direction 16. FIG. 2 shows the detailed structure of the carriage 14, which includes a plurality of stalls 22, each adapted to hold a disposable inkjet print cartridge 24. The carriage shown in FIG. 2 has six stalls to house six disposable print cartridges respectively holding inks of different color types, i.e., cyan, magenta, yellow, black, light cyan, and light magenta. Many embodiments can be implemented for cartridge stall arrangements in the carriage, from different number of stalls to different ink color combinations. An example is the industry popular four-stall embodiment with cartridges having cyan, magenta, yellow, and black color inks. When a print cartridge 24 is inserted into a cartridge stall 22, a cartridge door 26, which is pivotally connected to the rear of the stall, is pushed down to the closed position to ensure secure fluid connection between the cartridge and the septum port 28 and secure electrical connection between the cartridge and a flex circuit cable (not shown) in the carriage. The flex circuit cable is further connected to a carriage electronic board (not shown) enclosed under the carriage cover 32. Each print cartridge 24 includes a print head 34 (FIGS. 3 and 24) attached on the bottom surface. The print head 34 has a nozzle plate containing columns of minute nozzles to eject ink droplets for image printing. The carriage assembly 14 includes the sliding bushings 30 to engage the shaft 18, which are rigidly mounted on the printer structure, to ensure that the carriage movement is linear and smooth.

Back to FIG. 1, either roll media (not shown) can be mounted on the media roll holder 20 for a continuous supply of media, or sheets of media (not shown) can be fed, in printer 2. A Raster Image Processor (RIP) controls image manipulation and the resultant image file is delivered to printer 2 via a remotely located computer through a communication port. Upon receiving the image data, the printer electronics translates the data into printer actions, including sending electrical impulse signals to the print heads on the print cartridges 24 to eject ink droplets on the receiving media to form images, moving the carriage 14 back and forth to cover the media width, and stepping advances the media in a direction orthogonal to the carriage scanning direction 16. The printer actions can include media drying involving a media heater (not shown) and the air blower 12.

Ink Delivery System and Performance Requirements

The ink delivery system needs to satisfy performance requirements of the printer according to the market the printer is developed for or sold to. For a desk-top or small format inkjet printer, the ink delivery system is usually enclosed in the print cartridge housing or resides on the carriage due to the printer space and cost limitations. The on-carriage ink container is usually small and contains less than 100 ml of ink supply to avoid loading the rapid moving carriage with too much weight.

A wide format printer typically consumes much more ink than a small format printer. Therefore, if an ink delivery system has only an on-carriage replaceable ink container or replaceable print cartridge, then that ink container or print cartridge will have to be frequently replaced, which is inconvenient for printing operation. Loading large volumes of inks on the carriage would lead to a more costly mechanism for carriage movement and also to more mechanical breakdowns due to the increased stress on the components that must support and move the ink volumes. One solution is to provide large volumes of stationary ink supplies mounted on the printer frame, and connect the ink supplies to the print cartridges on the moving carriage through flexible tubing. The off-carriage ink supplies, therefore, provide substantially continuous replenishment of inks to the print cartridges on the carriage. An example of off-carriage ink delivery system is disclosed in U.S. Pat. No. 5,686,947, which is incorporated herein by reference. Benefits of such an ink delivery system include avoiding the extra weight on the carriage and reducing operation cost by extending the printing life of the disposable cartridges in the printer. As the inkjet technology has improved over the years, the print cartridges on the market today enjoy longer printing life than earlier print cartridges. It can be advantageous even for a desktop inkjet printer to include an off-carriage ink delivery system to thereby reduce the operational costs associated with replacing ink containers without having to replace the more expensive print cartridges.

Figure 3:
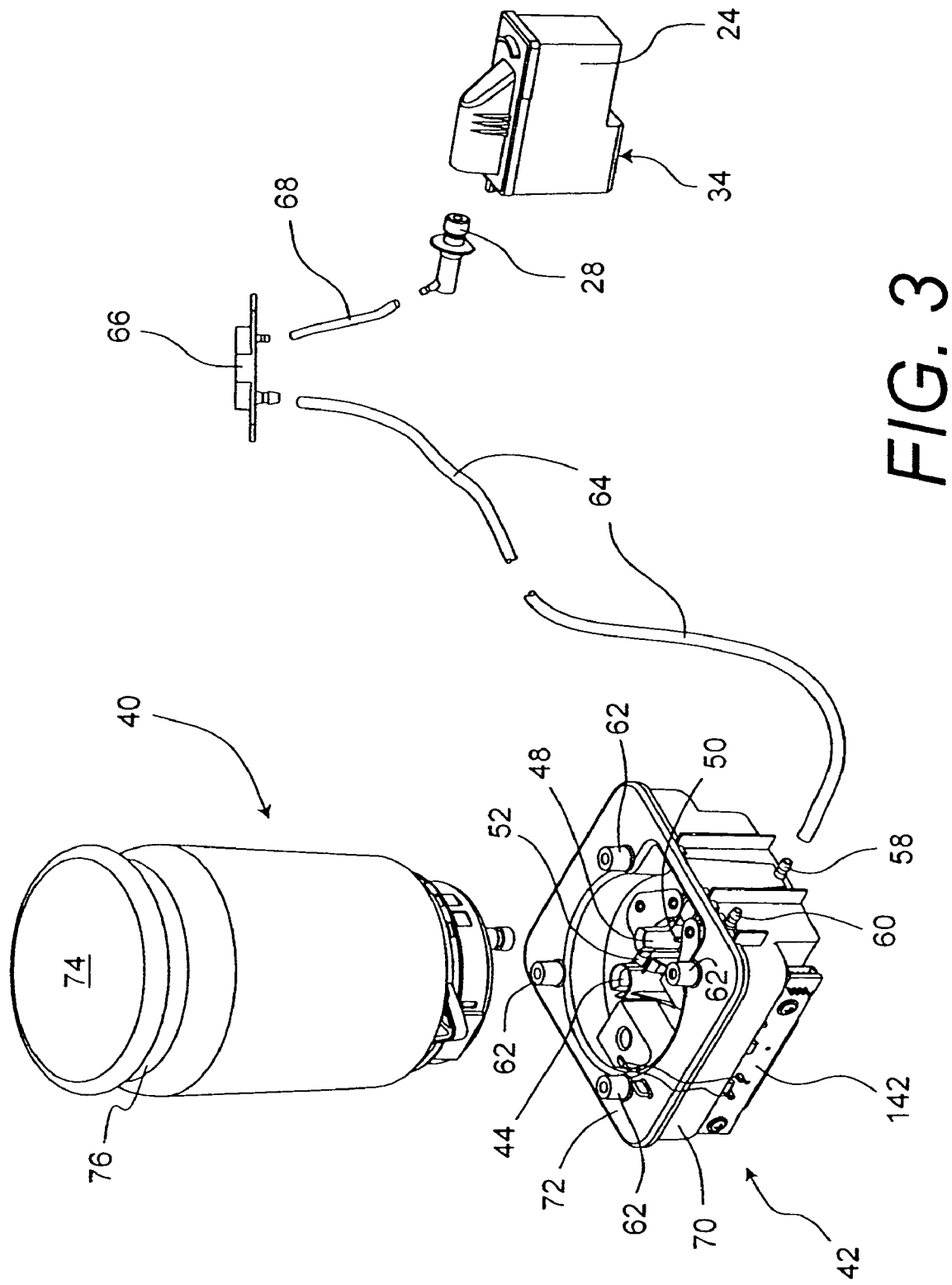
FIG. 3 is a partially exploded perspective view of an ink delivery system for one ink, including an ink container, an ink reservoir, flexible tubing, a pulsation dampener, a septum port, and a disposable inkjet print cartridge.

An ink delivery system should preferably meet other requirements in addition to providing substantially continuous ink replenishment for the print cartridges. It is important for the ink system to deliver proper back pressure to the print heads on the print cartridges to ensure good drop ejection quality. Back pressure is measured inside the print cartridge close to the print head, and is in slightly negative gage pressure or slight vacuum. Commercially available print heads typically require back pressure in the range of 0 to −15 inch $H_2O$, and preferably in the range of −1 to −9 inch $H_2O$. It is desirable that the ink delivery system is capable of detecting low ink supply and making decisions to send a warning signal to the operator or to stop printing. FIG. 3 illustrates an ink delivery system and its components for one of the inks used in printer 2. The key components of the ink delivery system are an ink container 40, an ink reservoir 42, flexible tubing 64, an inkjet print cartridge 24, and optionally a pulsation dampener 66, flexible tubing 68, and a septum port 28. Each important part of the ink delivery system and its effect on the performance will be disclosed in detail in the subsequent sections.

Ink Container

Figures 4, 5:
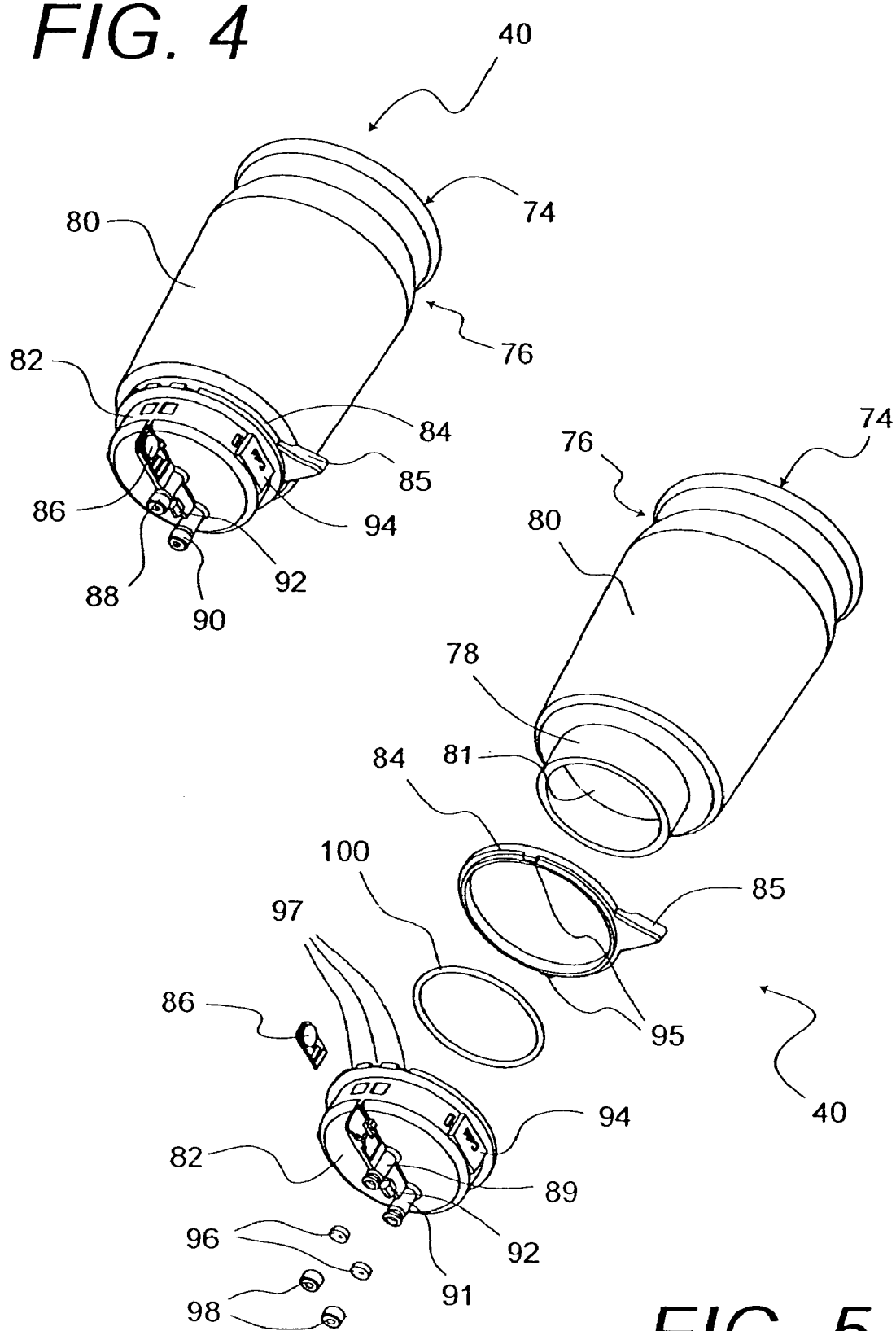
FIG. 4 is a perspective view of a large volume ink container for the inkjet printer in FIG. 1.
FIG. 5 is an exploded perspective view of a preferred embodiment of the ink container in FIG. 4.

FIGS. 4 and 5 show one of the ink containers 40 in printer 2 as shown and discussed with reference to FIG. 3. The ink container 40 includes a bottle 80, a cap 82, a color indicator ring 84, and an O-ring 100. When installed in the printer 2, the ink container 40 is in a cap-down and bottle bottom-up position. The bottle 80 is preferred to be a Nalgene type blow-molded bottle to have a generally cylindrical shape (circular in cross-section) and a relatively flat top surface, creating an internal cavity 81 for holding ink. Possible materials of the bottle 80 include high-density polyethylene, polypropylene, Lexan®, or other types of polymeric materials which are suitable for blow molding. In the preferred embodiment, the bottle 80 is made of substantially transparent or translucent material so that the ink color can be observed through the bottle wall. Just below the top surface 74, an indented ring feature 76 is molded for the ease of gripping. The internal cavity 81 of the bottle 80 can be sized to hold from fractions of a liter up to liters of ink according to requirements. The lower part of the bottle 80 is a threaded neck 78 to be threaded with the cap 82. When the cap 82 and the bottle 80 are assembled, an O-ring 100 is tightly sandwiched between them to form a hermetic seal. Preferably, the cap 82 is molded with the same material as that of the bottle 80 for the best thermal expansion match. The hermetic seal between the bottle 80 and the cap 82 can also be created by permanently welding the two parts together without the O-ring, for example by means of ultra-sonic welding or induction welding.

As shown in FIGS. 4 and 5, the color indicator ring 84 is located between the bottle 80 and the cap 82 of the ink container assembly 40. The color indicator ring 84 has two teeth 95 located on the opposite sides of the ring 84, which can fit into multiple cut-outs 97 positioned on the rim of the cap 82. During the assembly process of the ink container 40, the color indicator ring 84 is rotated against the cap 82 to find the correct orientation, and the teeth 95 of the ring 84 are bit into the correct cut-outs 97 of the cap 82 before cap 82 is threaded to the bottle 80. The cap 82 has six cut-outs 97, allowing the color indicator ring 84 to have six unique angular orientations relative to the cap 82, each orientation specific to one of the six different ink colors used in printer 2. The correct angular positioning of the color indicator ring 84 may be helped by the ring locator 94 on the cap 82, which includes molded-in or labeled symbols to indicate ink color type of the ink container 40. For each color indicator ring 84 to cap 82 orientation, a unique angle is defined between the direction pointed by the key 85 on the color indicator ring 84 and a line formed by the air inlet channel 88 and the ink exit channel 90. When the ink container 40 is connected to the ink reservoir 42 in FIG. 3, the air inlet channel 88 on the ink container 40 fits into the air shroud 44 on the ink reservoir 42, and the ink exit channel 90 fits into the ink shroud 48. Therefore, the key 85 on the color indicator ring 84 is pointing to a unique direction for each color of the ink container 40. It is important to note that the unique orientation of the color indicator ring 84 is relative to the cap 82, not relative to the bottle 80. The bottle 80 can be turned to adjust the tightness of thread into the cap 82 without affecting the color indicator ring 84 to the cap 82 orientation. Those skilled in the art will recognize that although six unique orientations are illustrated, the number of orientations can easily be increased or decreased for those skilled in the art. Generally speaking the color indicator ring 84 may be positioned in plural orientations relative to the cap 82 to provide for color or ink type discrimination for a plurality ink containers 40 containing different color/ink types.

Figure 6:
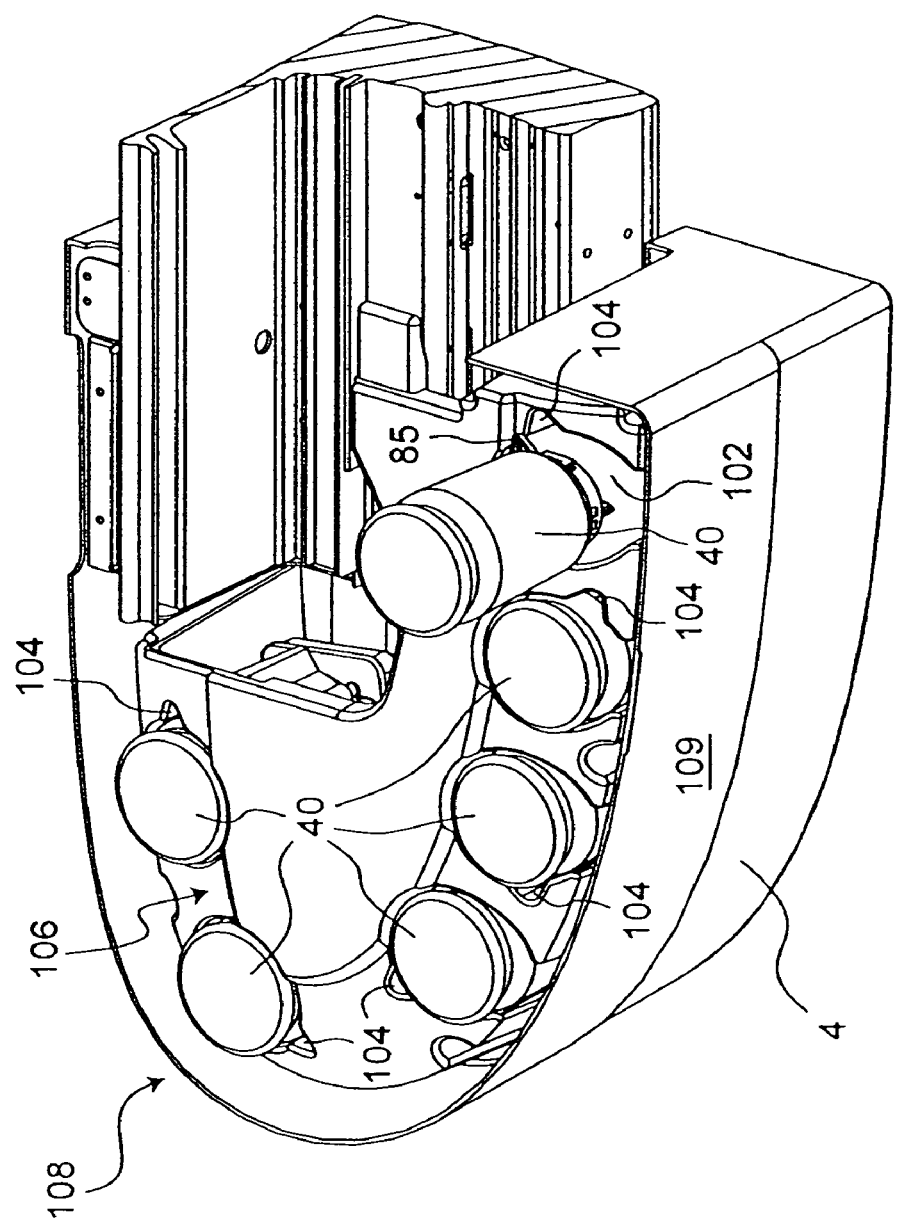
FIG. 6 is a perspective view of an ink supply station residing at one end of the inkjet printer in FIG. 1, containing a plurality of the ink containers of FIG. 4 therein and showing one such ink containers partially removed therefrom.

Referring to FIG. 6, when the ink container 40 is dropped into a container receptacle 102 in the ink supply station 108, the ink container 40 is turned around to align the key 85 on the color indicator ring 84 with the groove 104, which is uniquely positioned in each of the receptacles 102 in the ink supply base 106. The unique angular orientation of the color indicator ring 84 ensures proper alignment of air inlet channel 88 and ink exit channel 90 by allowing only a predetermined ink container containing a predetermined color of ink to establish fluid connection with the ink reservoir 42 located under the correct ink receptacle 102. Further, preferably both the air inlet channel 88 and the ink exit channel 90 are positioned off-center on the cap 82 so that an inadvertent fluid connection cannot be established as a result of symmetry of the ink container 40. The bottle 80 of the ink container 40, being circular in cross-section, has the advantage of being rotatable when partially inserted into the ink receptacle 102 thereby allowing the user to position the key 85 projecting from the color indicator ring 84 into the groove 104 in the receptacle 102. However, it should be recognized that the bottle 80 can take other shapes as long as the outer dimension of the bottle 80 is smaller than the inside diameter of the receptacle 102 so that the ink container 40 can be freely rotated with respect to the receptacle 102 for proper positioning.

The air inlet channel 88 and ink exit channel 90 both include tubular supports 89, 91 extended on the cap 82, rubber septums 96, and metal caps 98. Rubber septums 96 are diaphragms with slits therethrough. The tubular support has a counter bore 93 at the end which is slightly shallower than the thickness of the septum 96 and slightly smaller in diameter than that of the rubber septum 96. When the rubber septum 96 is inserted into the counter bore 93 (FIGS. 12 and 13) in the tubular support 89 or 91 and is held in place by clamping the metal cap 98 onto the tubular support 89 or 91, a hermetic seal is formed between the septum 96 and the tubular support. The rubber septum 96 is pre-slit by a blade, a round needle or a star-pointed needle so that the septum 96 is normally closed and allows easy piercing. The ink container 40, therefore, provides an internal cavity to contain a supply of ink normally sealed from atmosphere. The septum channels 88 and 90 on the ink container 40 are to be connected with the conduit needles 46 and 50 on the ink reservoir 42 to establish a quick disconnect fluid connection. Generally speaking, a quick disconnect connection member quickly closes the fluid channel after being disconnected. When a septum channel 88 or 90 is disconnected with mating needle 46 or 50, the septum 96 closes and shuts off the flow of ink, thus forming a quick disconnect connection. Other quick disconnect fluid connections can be used with the ink container 40. For example, a quick disconnect coupling, which has a spring-loaded valve to shut off the flow upon disconnection, can be used. An example of commercially available quick disconnect coupling is the PMC12 series available from Colder Products. When the ink container 40 is installed in the ink reservoir 42 (FIG. 3), the projection 92 on the cap 82 is snapped into the snap-fit receptacle 52 on the ink reservoir 42 to keep the ink container in place for secure fluid connection between the ink container and the ink reservoir.

Referring again to FIGS. 4 and 5, the cap 82 of the ink container 40 further includes a memory chip assembly 86 to track information for the ink container 40 and the ink contained.

Figure 7:
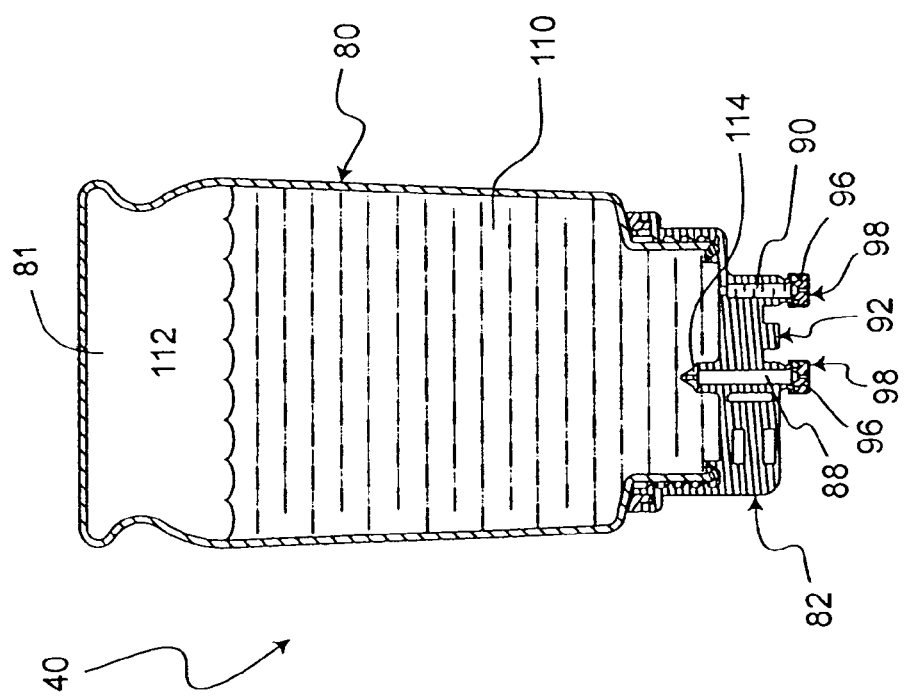
FIG. 7 is a cross-sectional view of the preferred embodiment of the ink container in FIGS. 4 and 5.
Figure 10:
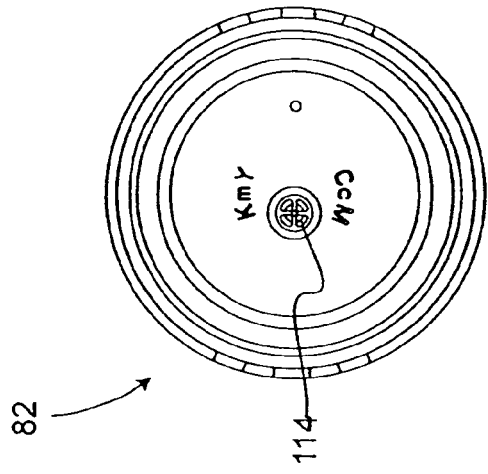
FIG. 10 is a top view of the ink container cap of FIG. 9.
Figure 9:
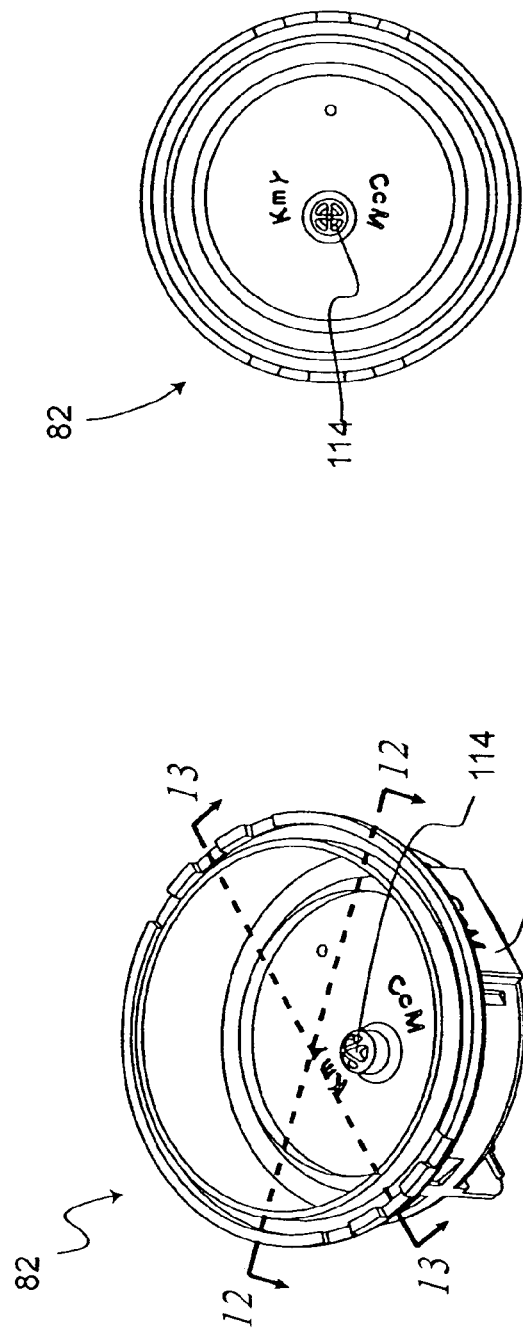
FIG. 9 is a perspective view of the ink container cap shown in FIGS. 4, 5, 7 and 8.
Figure 11:
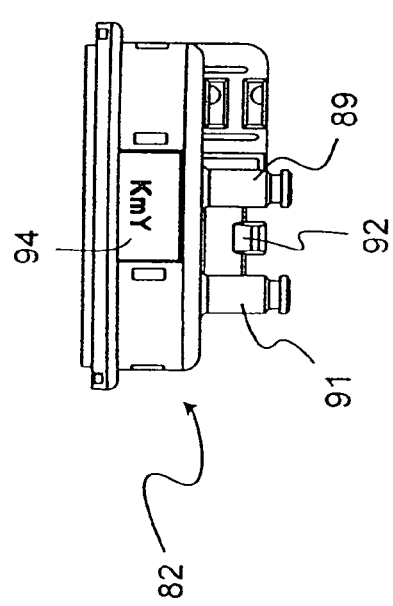
FIG. 11 is a front view of the ink container cap of FIG. 9.

FIG. 7 is a cross-sectional view of a preferred embodiment of the ink container 40 at operation orientation. The ink container contains ink 110 and an air pocket 112 above the ink. During operation when the ink container 40 is installed onto the ink reservoir 42 to establish air and ink connections, ink flows from the ink container to the ink reservoir through the ink exit channel 90 due to gravity or static head. Since the container 40 is hermetically sealed from atmosphere, the pressure of the air pocket 112 decreases to negative gauge pressure as ink flows out of the container. The internal negative pressure then acts to draw air through the air inlet channel 88 into the container 40. The details of ink and air exchange between the ink container 40 and the ink reservoir 42 will be further explained later with reference to FIG. 15. Another embodiment of the ink container is shown in FIG. 8, which includes an air guide tube 116 to connect the air entrance opening 114 to the air pocket 112 above the ink 110.

It should be understood by those skilled in the art that bubble formation at the air entrance opening 114 plays an important role in the performance of the ink container 40. Foaming or easy bubble formation is usually a characteristic of inkjet inks. Inkjet ink typically includes surfactants to adjust surface tension for optimal ink spreading on media to achieve the best image quality. Another important physical property of inkjet ink related to ink spreading on media is viscosity, which is affected by humectants and other ink components. The surface tension and viscosity of inkjet ink are also designed for optimal drop ejection quality at the print head. A side effect of surfactants in ink is foaming or easy bubble formation. The viscosity of ink affects the flow effectiveness which can affect bubble formation. Typical inkjet inks comprise surfactants including, for example, the Surfynol® series available from Air Products Corp., the Tergitol® series available from Union Carbide, the Tamol® and Triton® series from Rohm and Haas Co, the Zonyls® from DuPont and the Fluorads® from 3M to adjust surface tension to the range of 15–65 dyne/cm, preferably 20–35 dyne/cm, and further include viscosity affecting components such as polyhydric alcohols, e.g., ethylene glycol, diethylene glycol, triethylene glycol, propylene glycol, tetraethylene glycol, polyethylene glycol, glycerol, and thioglycol, lower alkyl mono-ethers or lower alkyl di-ethers derived from alkylene glycols, nitrogen-containing cyclic compounds, e.g., 2-pyrrolidone, N-methyl-2-pyrrolidone, and 1,3-dimethyl-2-imidazolidinone, alkanediols, e.g., 1,2-butanediol, 1,2-pentanediol, 1,2-hexanediol, 1,3-butanediol, 1,3-pentanediol, 1,3-hexanediol, 1,4-butanediol, 1,5-pentanediol, 1,6-hexanediol, and 1,2,6-hexanetriol to adjust viscosity to the range of 1–10 cP, preferably 1.2–3.5 cP.

Figure 8:
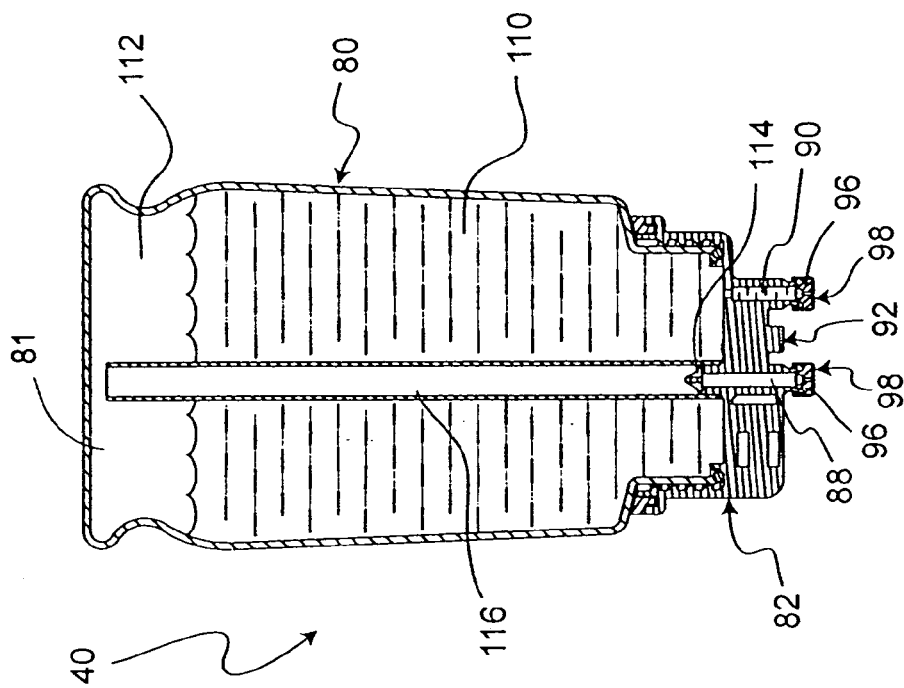
FIG. 8 is a cross-sectional view of an alternative embodiment of the ink container in FIG. 4.

In FIGS. 7 and 8, when air enters the ink container 40 from the air inlet channel 88, an air-liquid meniscus is formed at the air entrance opening 114, separating the air in the inlet channel 88 and the ink in the container 40. The meniscus is an energy barrier, and it requires some level of energy to break up so that a bubble can form at the entrance opening 114 and flow up through the ink in the container 40. The driving force of ink flowing out of the container 40 through the ink exit channel 90 is gravity or the static head of the ink within the container 40. This driving force causes a negative gauge pressure in the air pocket 112 initially strong enough to break the air-liquid meniscus to allow air bubbles to form at the entrance opening 114 and to rise up in the container 40. This results in reduced negative pressure in magnitude in the air pocket 112, and consequently allows more ink 110 to flow out of the container 40 through the ink exit channel 90, triggering another round of ink-exit-air-inlet cycle. As more ink 110 flows out, the height of ink 110 in the ink container 40 decreases, thereby decreasing the static head. It is anticipated, therefore, that a strong air-liquid meniscus at the air entrance opening 114 will prohibit air entering the container when the height of ink 110 in the container 40 is lower than a certain limit.

Figure 13:
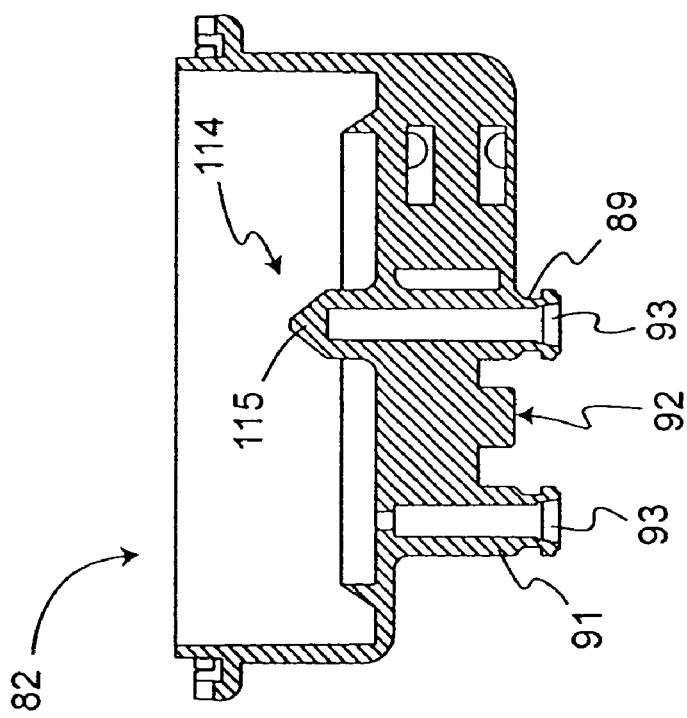
FIG. 13 is a cross-sectional view of the ink container cap taken along line 13—13 in FIG. 9.
Figure 12:
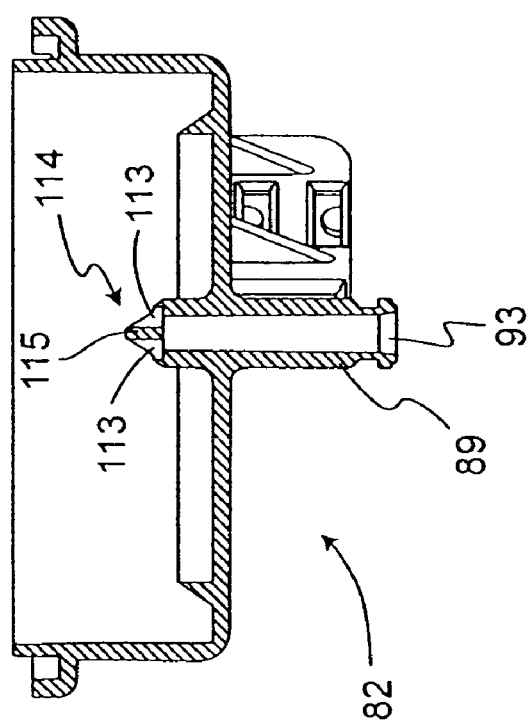
FIG. 12 is a cross-sectional view of the ink container cap taken along line 12—12 in FIG. 9.

Early test versions of the ink container had a circular air entrance opening. Testing of these early versions showed that a significant amount of ink would remain in the container and not be supplied to the reservoir when the air inlet channel stopped "breathing". In some instances, more than one third of the ink in the container would be wasted due to the air inlet channel blockage by an air bubble barrier. FIGS. 9–13 show views of the preferred embodiment of the cap 82 with improved entrance opening of the air inlet channel 88. The air entrance opening 114 is characterized by four triangular sloped openings 113 partitioned by shared walls 115 extending from the air inlet channel 88, as shown in FIGS. 12 and 13. Therefore, the improvement from the early test versions involved a non-circular shaped entrance opening to cause easy breakup of the air-liquid meniscus formed at the opening. The area of the entrance opening can be expressed as $\pi R^2$, where R is radius for a circular opening or an equivalent radius for a non-circular opening. Assuming that a non-circular opening has an area A, then the equivalent radius R of that non-circular opening may be determined using the following equation:

$$R = (A/\pi)^{1/2}$$

For a circular entrance opening, the perimeter to area ratio is $2\pi R/\pi R^2 = 2/R$. A non-circular entrance opening has a larger perimeter to area ratio than that of a circular entrance opening with same area size. Therefore, for a non-circular entrance opening, the perimeter to area ratio, or shape factor, is greater than $2/R$, where R is the equivalent radius so that the area size of the non-circular entrance opening is equal to $\pi R^2$. Therefore, forming a meniscus at a non-circular opening requires extra energy as compared to forming a meniscus at a circular opening with the same area size, because more work is needed to extend the meniscus to cover the extra length of perimeter. The amount of work needed to form a meniscus at an opening is also related to the viscosity of ink since more viscous ink requires more work to form the same size of meniscus. According to the second law of thermodynamics, a lower energy state is more stable than a higher energy state. The meniscus at a non-circular opening, which is at a higher energy state than that at a circular opening with the same area size, is thus at a less stable energy state. In FIG. 7, when air is pulled by the negative gauge pressure in the air pocket 112 and flows into the inlet channel 88, it pushes to stretch the meniscus at the entrance opening 114, causing the meniscus to go more unstable. The extra initial energy stored by the meniscus of a non-circular opening leads to easier breakup of the meniscus from the opening to form the lower energy state and more stable bubbles. In other word, the meniscus at a non-circular opening provides "free energy" for the meniscus to transform to bubbles. Therefore, less or little work is needed from the air pushing movement in the air inlet channel if the entrance opening has a favorable shape. Testing showed that the preferred embodiment air entrance opening shown in FIGS. 7–13 did significantly better for depleting ink 110 in the ink container 40. For certain ink types and physical property ranges, the ink 110 in the container 40 was completely drained during printing operations.

Figure 14:
FIGS. 14A through F schematically depict various examples of air inlet channel entrance opening shapes.
Figure 14:
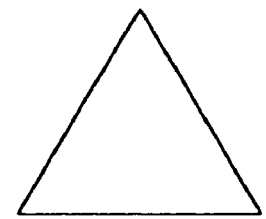
Figure 14:
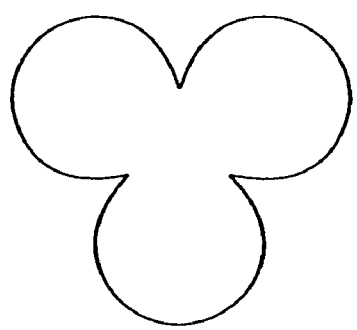
Figure 14:
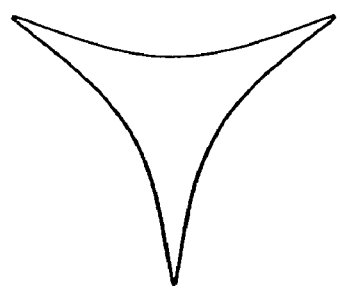
Figure 14:
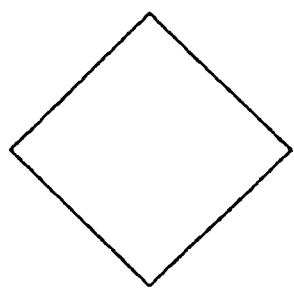
Figure 14:
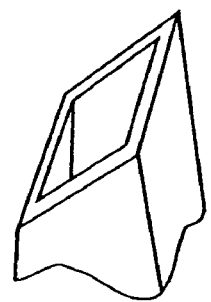

The air entrance opening 114 can take other non-circular shapes as long as the shape factor, or perimeter to area ratio, is greater than $2/R$, where R is the equivalent radius so that the area size of the non-circular entrance opening is equal to $\pi R^2$. The larger the shape factor is, the more likely that bubbles can break up from the entrance opening. It is preferred that an entrance opening 114 has a shape factor greater than $1.25*2/R$, or $2.5/R$. An equal sized triangular opening, for example, has a shape factor of $2.56/R$, while a square opening has a shape factor of $2.26/R$. Some examples of possible air entrance shapes are shown in FIG. 14, where A-E are planar openings to achieve a large shape factor and F involves a sloped opening with large shape factor. A sloped opening gives gravitational instability to the meniscus in addition to the shape related instability. Other possible embodiments of opening shapes can be readily constructed by those skilled in the art without departing the spirit and scope of the invention.

For ink container embodiment illustrated in FIG. 8, residue ink enters the air inlet channel 88 from the ink reservoir 42 during the substantially continuous ink filling from the ink container 40 to the ink reservoir 42 to cause foaming at the air entrance opening inside the air guide tube 116. The above discussion of bubble breakup at the entrance opening 114 associated with FIG. 7 in general applies to the embodiment of FIG. 8.

Ink Level Control in the Ink Reservoir

The ink level variation in the ink reservoir 42 plays an important role in determining the back pressure in the print cartridge 24. For an off-carriage ink delivery system, the back pressure in the print cartridge 24 is related to the ink level in the stationary ink reservoir 42, the pressure drop due to the viscous ink flow in the connection from the ink reservoir 42 to the print cartridge 24, and the pressure fluctuation due to the carriage movement. The ink level in the ink reservoir 42 determines the static back pressure when the printer 2 is at rest.

Figure 15:
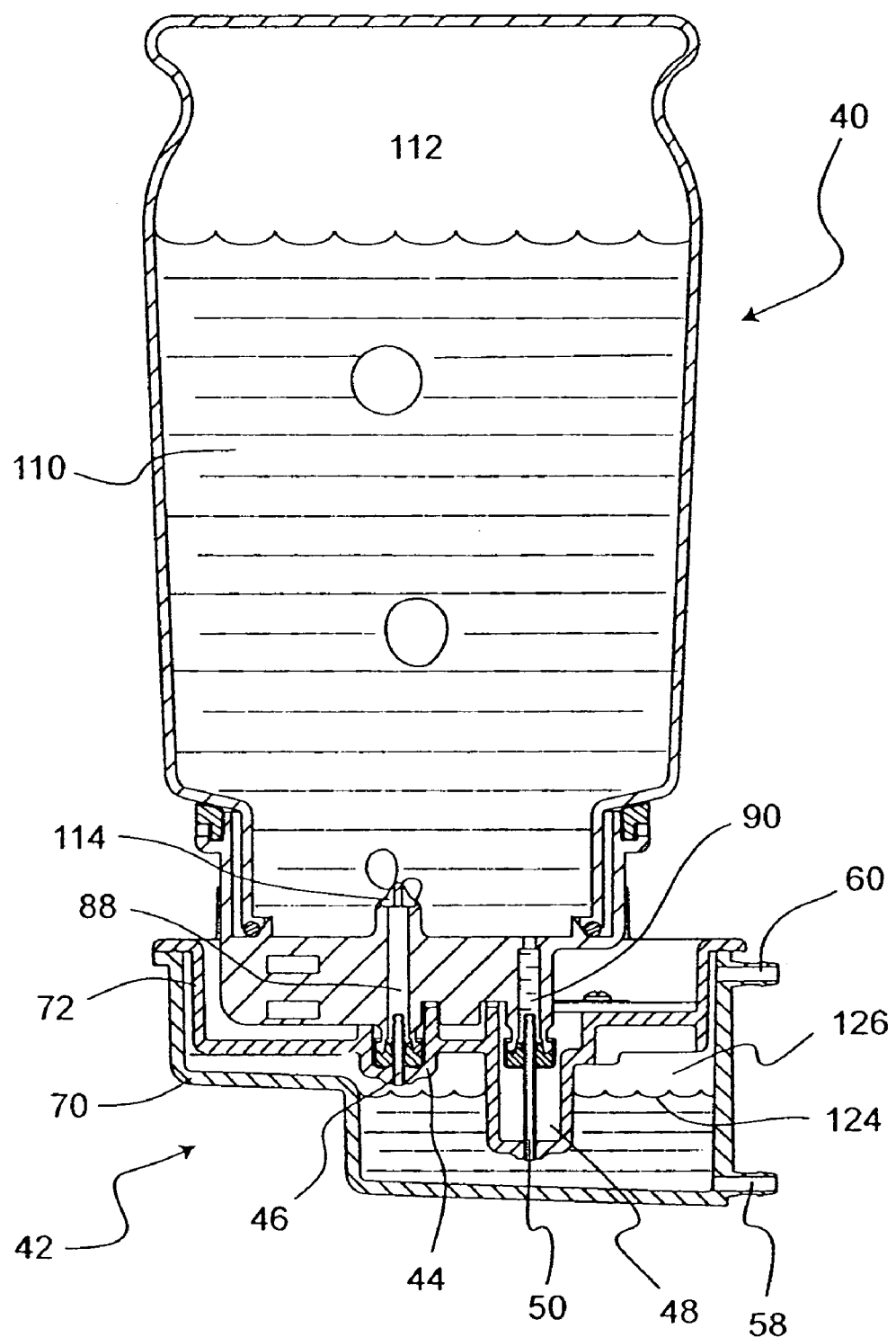
FIG. 15 is a cross-sectional view illustrating ink level control in an ink reservoir when the ink reservoir is engaged with an ink container.

FIG. 15 shows a cross-sectional view of the ink container 40 connected to the ink reservoir 42. Reservoir 42 has a molded housing 70 to hold a volume of ink, and a molded cover 72 to provide a receiving cavity on top to receive the cap 82 of the ink container 40. An air conduit needle 46 and an ink conduit needle 50 extend from the air shroud 44 and the ink shroud 48, respectively, for fluid connections with the ink container 40. The cover 72 and the housing 70 of the ink reservoir are attached together by ultrasonic welding or other means. Polymeric materials, such as high density polyethylene, polypropylene, Lexan®, can be used for molding. In FIG. 6 under each of receptacles 102 is attached an ink reservoir 42 through the mounting buses 62 (FIG. 3) on the top surface of the ink reservoir 42 and corresponding mounting feature (not shown) on the ink supply base 106. When an ink container 40 is installed into a receptacle 102 on the ink supply base 106, the container 40 is first rotated so that the key 85 of the color indicator ring 84 mates into the groove 104 on the ink supply base 106 as discussed above. The container 40 is then further dropped down in the receptacle 102 allowing the cap 82 of the container 40 to fit into the receiving cavity on top of the ink reservoir 42, as shown in FIG. 15. The unique orientation of the color indicator ring 84 according to the air inlet channel 88 and ink exit channel 90 locations ensures that only the ink container and the ink reservoir of the same ink color type can establish air and ink connection, which involves aligning the air inlet channel 88 on the ink container 40 with the air shroud 44 on the ink reservoir 42 and aligning the ink exit channel 90 with the ink shroud 48. Upon good channel-to-shroud alignments, the ink container 40 is further pushed down so that the projection 92 on the cap 82 is snapped into the snap-fit receptacle 52 on the ink reservoir 42, and simultaneously the conduit needles 46, 50 in the shrouds 44, 48 pierce into the rubber septums 96 on the channels 88, 90 to establish air and ink connections between the container 40 and the reservoir 42 (FIGS. 3 and 15). The fluid connections between the ink container 40 and the ink reservoir 42 can also be made using male/female quick disconnect couplings readily available on the market.

During the printer operation, ink flows down from the ink exit channel 90 of the ink container through the ink conduit needle 50 into the ink reservoir 42, causing the ink level 124 in the reservoir 42 to rise. When ink 110 is depleted from the ink container 40, a negative gauge pressure or a partial vacuum is developed in the air pocket 112. The negative pressure then serves as a driving force to pull air through the air conduit needle 46 and air inlet channel 88 from the ink reservoir 42 into the ink container 40, which in turn reduces the vacuum level in the air pocket 112 and allows ink 110 to flow from the ink container 40 to the ink reservoir 42. With ink 110 from ink container 40 flowing into reservoir 42 the level of ink in the ink reservoir 42 rises to the bottom of air shroud 44 thereby submerging and blocking the end of the air conduit needle 46, and the ink 110 will cease to flow from container 40 into reservoir 42. As ink is spent at the print head 34 during printing, ink exits the ink reservoir 42 through the ink exit barb 58 to feed the print head 34, lowering the ink level 124, and consequently exposing the lower end of the air conduit needle 46 to the air gap 126 in the reservoir 42, allowing the ink refilling from the ink container 40 to the ink reservoir 42 to take place.

The air gap 126 in the ink reservoir 42 is open to atmosphere through the air barb 60, so that the variation of the fluid pressure inside the ink reservoir 42 is only related to the change of the ink level 124. The resulting ink level variation in reservoir 42 can thus be controlled to within a fraction of an inch, e.g., ⅛ inch. This is advantageous compared to static pressure control of prior art. The static back pressure in the print cartridge 24 is determined by the differential of the vertical position of the ink level 124 in the ink reservoir 42 relative to the vertical position of the print head 34, which is coupled to the print cartridge 24 (FIG. 3). Typically, the ink level 124 in the ink reservoir 42 needs to be below the print head 34 to avoid ink dripping from the nozzles on the print head when the printer 2 is at rest. The vertical position of the ink level 124 relative to the print head is adjusted by vertically positioning the ink reservoir 42 in the printer 2. As will be discussed hereinafter, the dynamic back pressure in the print cartridge 24 is further related to the fluid connection between the ink reservoir 42 and the print cartridge 24, the movement of the carriage 14, and the type of foam in the print cartridge 24. In general, the ink reservoir 42 is vertically positioned to cause the ink level 124 in the ink reservoir 42 to be 0–8 inches below the print head 34.

Low Ink Level State Detection in the Ink Reservoir

The large ink volume of the ink container 40 satisfies the continuous operation of wide format printer 2 without the concern that ink is running out within a plot or even within a series of plots. Preferably, the wall 109 of the ink supply station 108 and the ink container 40 are both made of materials that are substantially transparent or translucent so that the ink level in the ink container 40 can be inspected visually. When the ink level in an ink container 40 in the ink supply station 108 runs low, the operator will be able to detect the low ink level and replace the ink container in time. However, it is desirable for the printer 2 to have the capability to automatically detect the out of ink state of the ink container 40 to avoid catastrophic print cartridge or image printing failure.

Figure 16:
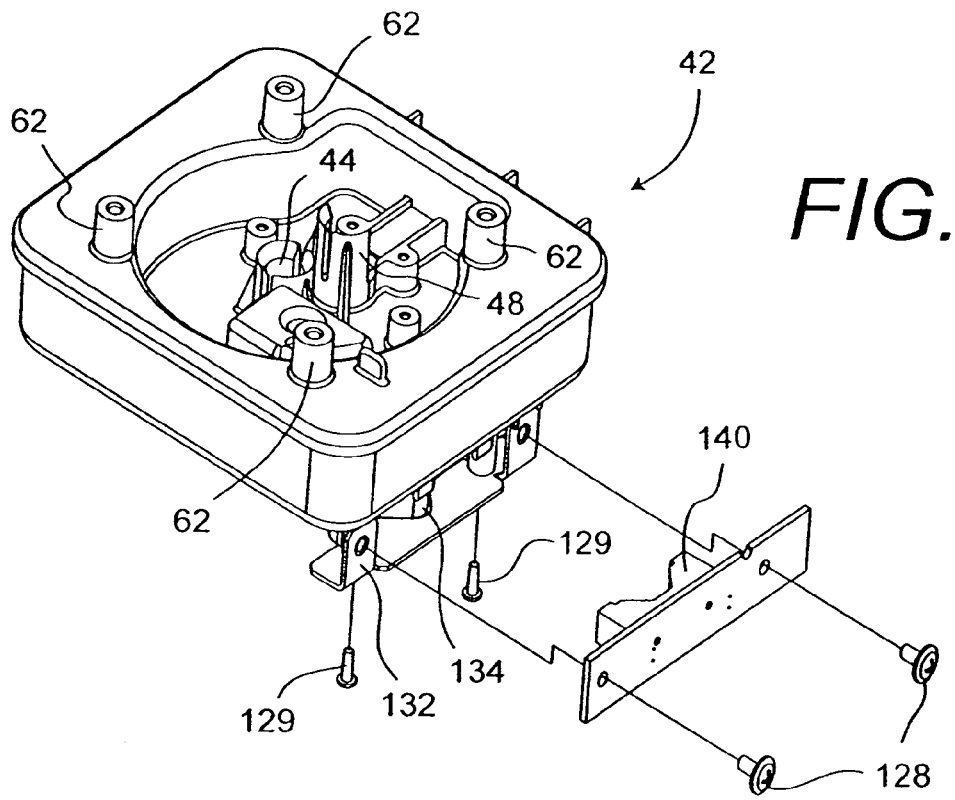
FIGS. 16 and 17 are different perspective views of the ink reservoir showing the liquid sensor assembly exploded therefrom.
Figure 17:
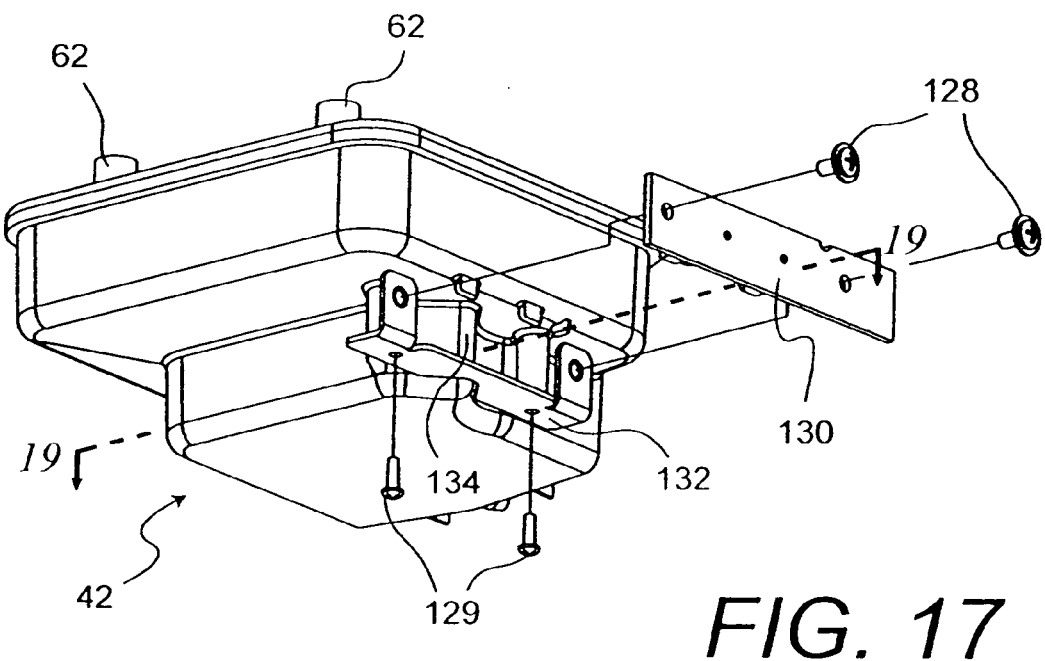
Figure 18:
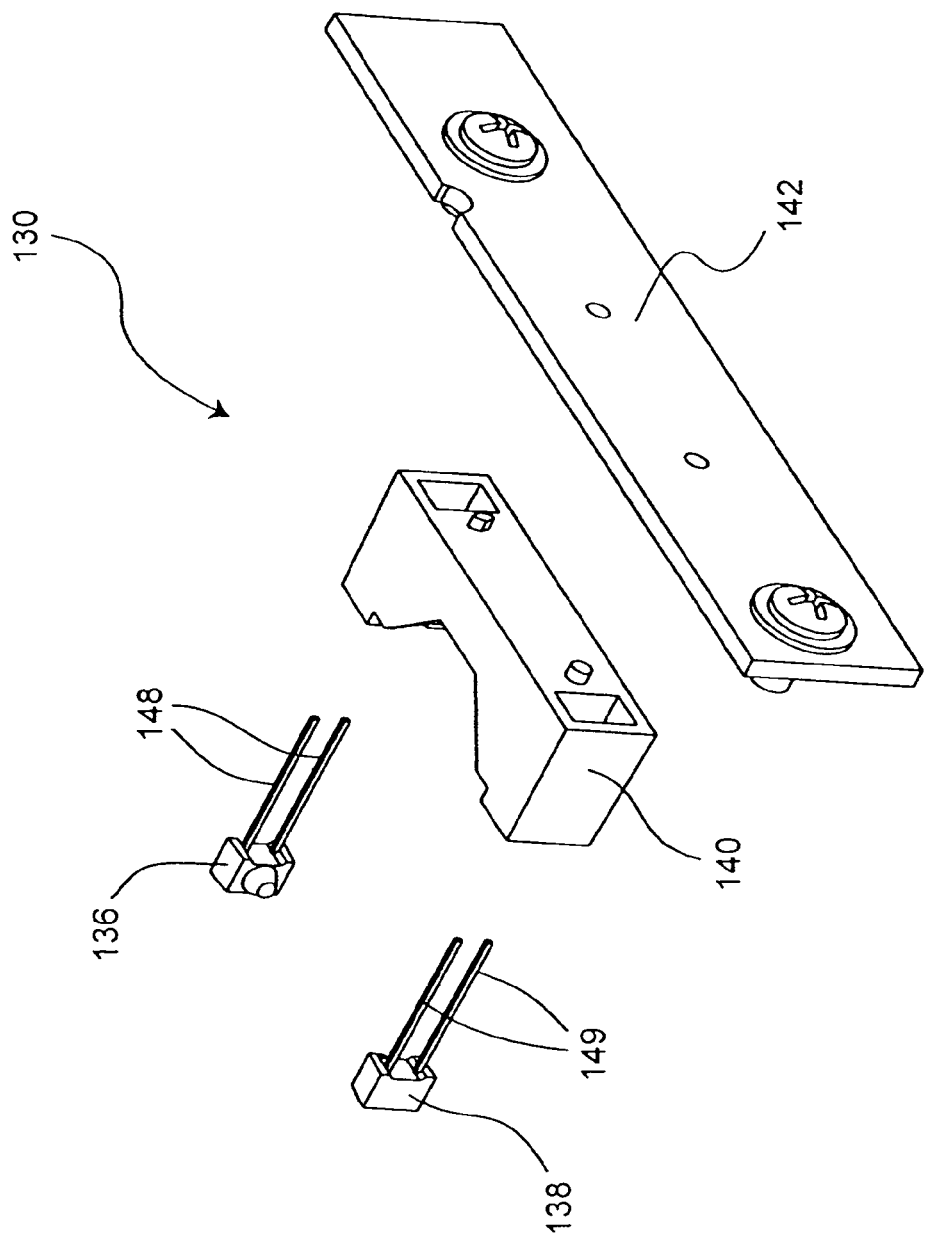
FIG. 18 is an exploded view of the sensor assembly shown in FIGS. 16 and 17.

Referring to FIGS. 16 and 17, an ink sensor assembly 130 is attached to the mounting bracket 132, which is attached to the lower portion of the ink reservoir 42. The sensor assembly 130 can be attached to the ink reservoir 42 by various means including mounting by screws 128, 129 as shown, and the mounting bracket 132 is only optional. Ink sensor assembly 130 is used to detect the presence or absence of ink at a predetermined level within ink reservoir 42. FIG. 18 shows the components of the sensor assembly 130, including a light emitter 136 and a light detector 138 mounted in a sensor housing 140, and a circuit board member 142. The sensor assembly 130 is held together by soldering the pins 148 of the light emitter 136 and the pins 149 of the light detector 138 to the circuit board member 142. A more rigid structure can be achieved by physically bonding or otherwise affixing the sensor housing 140 to the circuit board member 142. The light emitter 136 can be an LED in visible spectrum region or in invisible spectrum regions, for example, the Plastic Infrared Light Emitting Diode provided by Fairchild Semiconductor as Part No.

GEE113. A matching light detector 138 for the infrared emitting diode can be the Silicon Phototransistor, Part No. SDP8436, available from Honeywell. A commercially available emitter-detector assembly can also be used, for example, the Slotted Optical Switch, Part No. QVL25335, from Fairchild Semiconductor. In FIG. 18, the circuit board member 142 of the sensor assembly 130 includes electronic components (not shown) for processing the signal from the light detector and optionally for reading the memory chip installed on the ink container 40 (FIG. 3). The electronic components can also be located remote from the sensor assembly 130, for example, on the main electronic board located in the right side housing 6.

Figure 19:
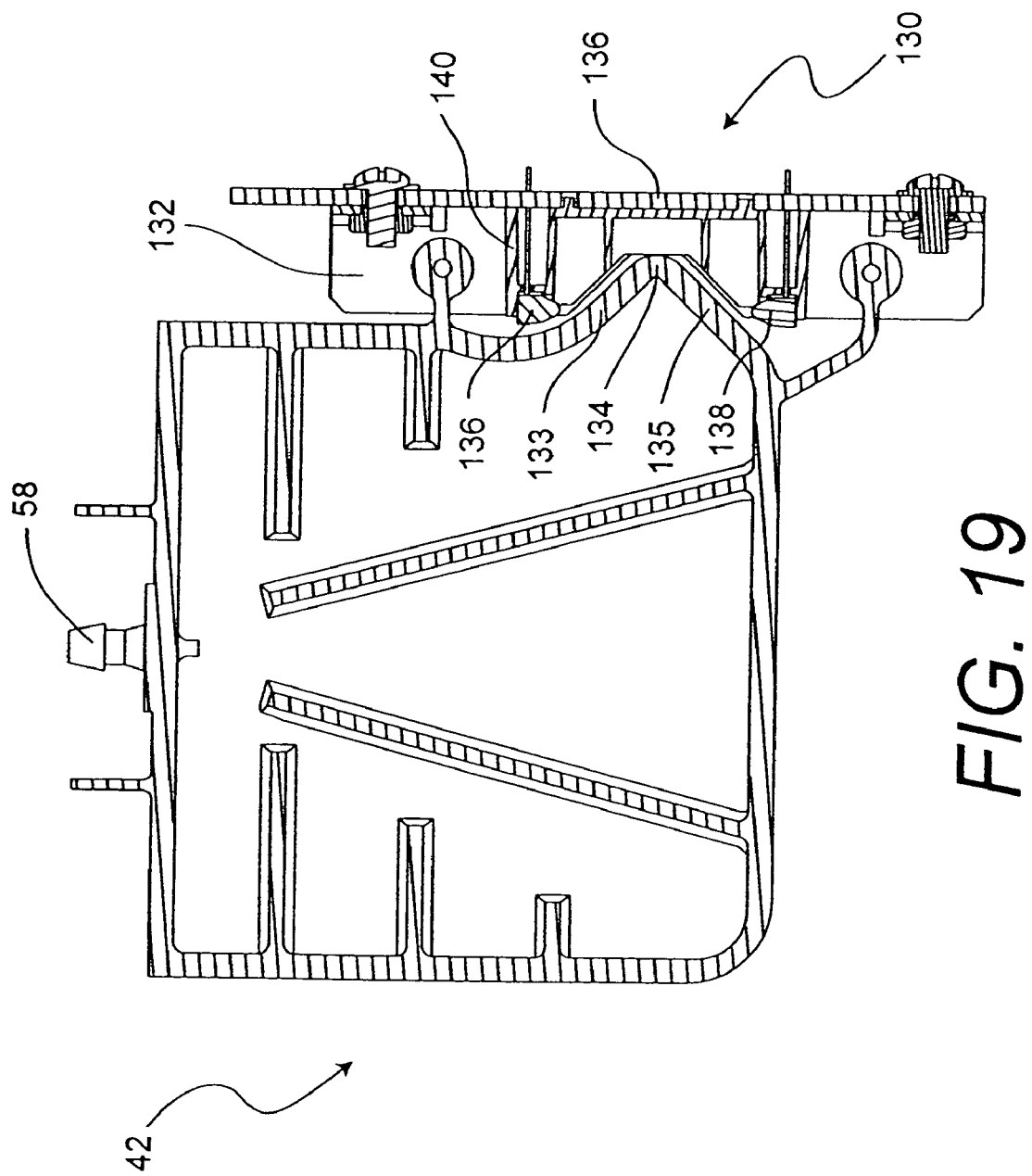
FIG. 19 is a cross-sectional view of the sensor assembly and ink reservoir assembly taken along line 19—19 of FIG. 17.

FIG. 19 is a cross-sectional view of the ink reservoir 42 taken along line 19—19 of FIG. 17, showing the sensor assembly 130 mounted on the ink reservoir 42. The light emitter 136 and the light detector 138 are positioned proximate to a protruding portion 134 of the ink reservoir 42. The protruding portion 134 is depicted as including two adjacent wall sections 133, 135 forming an angle therebetween. However, those skilled in the art will recognize that the protruding portion 134 may be shaped in the form of a convexity with a single, continuous, curved wall. At least those regions of the protruding portion 134 of the ink reservoir 42 adjacent to the light emitter 136 and the light detector 138 are made of material that is at least partially transparent to the light emitted from the light emitter 136. Although protruding portion 134 is shown as a projection from one wall of the ink reservoir 42, it should be understood that one of the corners of the ink reservoir 42, which is generally rectangular in cross-section, may be used as protruding portion 134. Protruding portion 134 may be formed integrally with ink reservoir 42, or it may be formed with one or more separate elements and affixed to main portion of the ink reservoir 42.

Figure 20A:
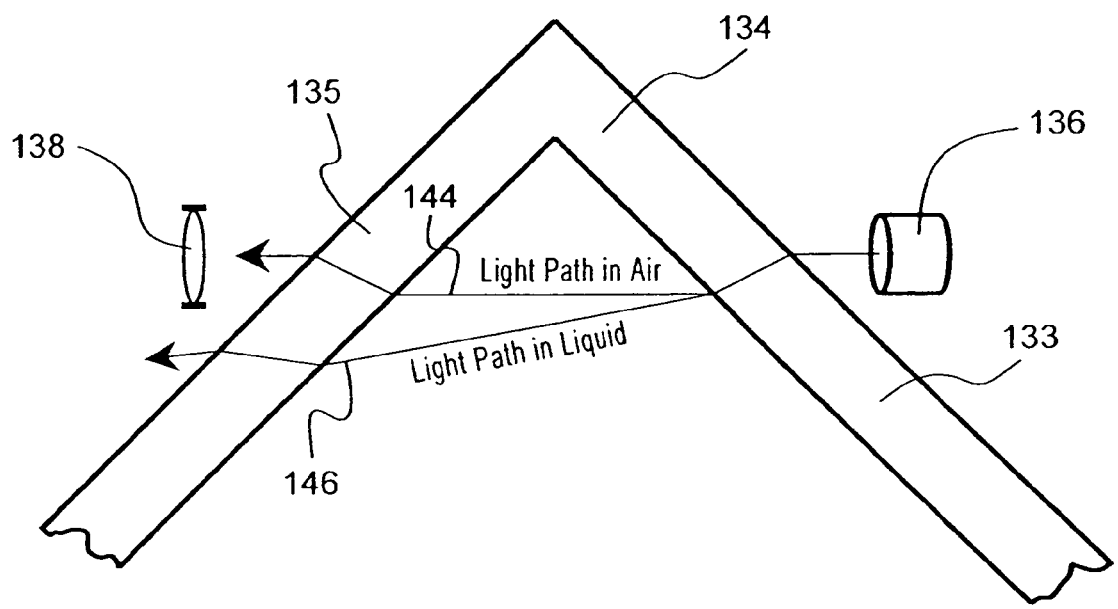
FIGS. 20A and 20B are schematics illustrating the alternate paths of light beams emitted from a light emitter depending on whether there is liquid present in the ink reservoir at the level at which the sensor assembly of FIG. 19 resides.
Figure 20B:
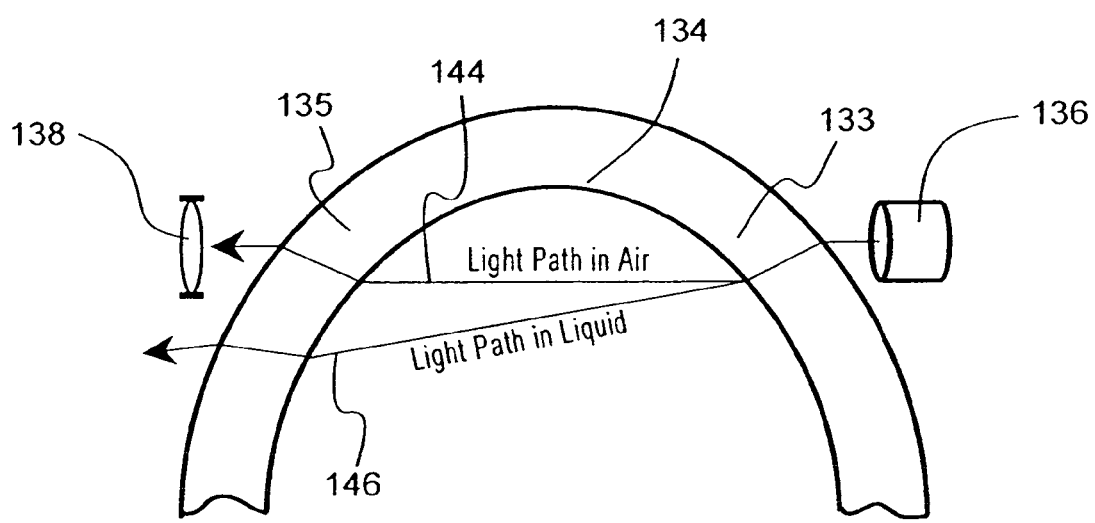

As shown in FIGS. 20A and 20B, as the light from the emitter 136 intersects the protruding portion 134, it is refracted at the air-to-solid interface due to the difference in the index of refraction of the two materials. With no ink present in the ink reservoir 42 between the emitter 136 and the detector 138, the light is refracted at the solid-to-air interface and takes a first refractive path 144 through the protruding portion 134 such that light from emitter 136 is incident on detector 138. When ink is present in ink reservoir 42 light from emitter 136 entering protruding portion 134 follows a second refractive path 146 such that light from emitter 136 is not incident on detector 138. The first refractive path 144 differs from the second refractive path 146 because the refractive index of air differs from the refractive index of the ink. When protruding portion 134 is formed by two intersecting walls 133, 135 the angle between such intersecting walls 133, 135 can be from acute to obtuse, and the shape of the wall sections from straight to contoured as long as light can travel from the emitter 136 entering into the protruding portion 134 to be incident on the detector 138.

Those skilled in the art will recognize that detector 138 can be positioned to receive light from emitter 136 on either of first or second refractive paths 144, 146. If detector 138 is placed on second refractive path 146, then a signal would be generated to indicate "low ink" when detector 138 was no longer detecting light from emitter 136.

In addition to working with light transmissive liquids, it should be recognized that the light sensing technique of the present invention can be used with opaque liquids, which absorb light, and with reflective liquids, which reflect light. Opaque and reflective liquids may act to reduce the intensity of light traveling through them. However, it should be apparent that such liquids will not have an effect on the first light path 144 when no liquid is present in the ink reservoir 42. In addition to ink, the light sensing technique of the present invention can be applied to sense the presence of other types of liquids commonly used. The following table contains indexes of refraction for commonly used liquids. It appears that all the listed liquids have indexes of refraction in the range of 1.329–1.473 which is significantly different from that of air.

| Material | Index of Refraction |
| --- | --- |
| Vacuum | 1.00000 |
| Air at STP | 1.00029 |
| Water (20° C.) | 1.333 |
| Alcohol | 1.329 |
| Ethyl Alcohol | 1.36 |
| Acetone | 1.36 |
| Glycerin | 1.473 |

Figure 21:
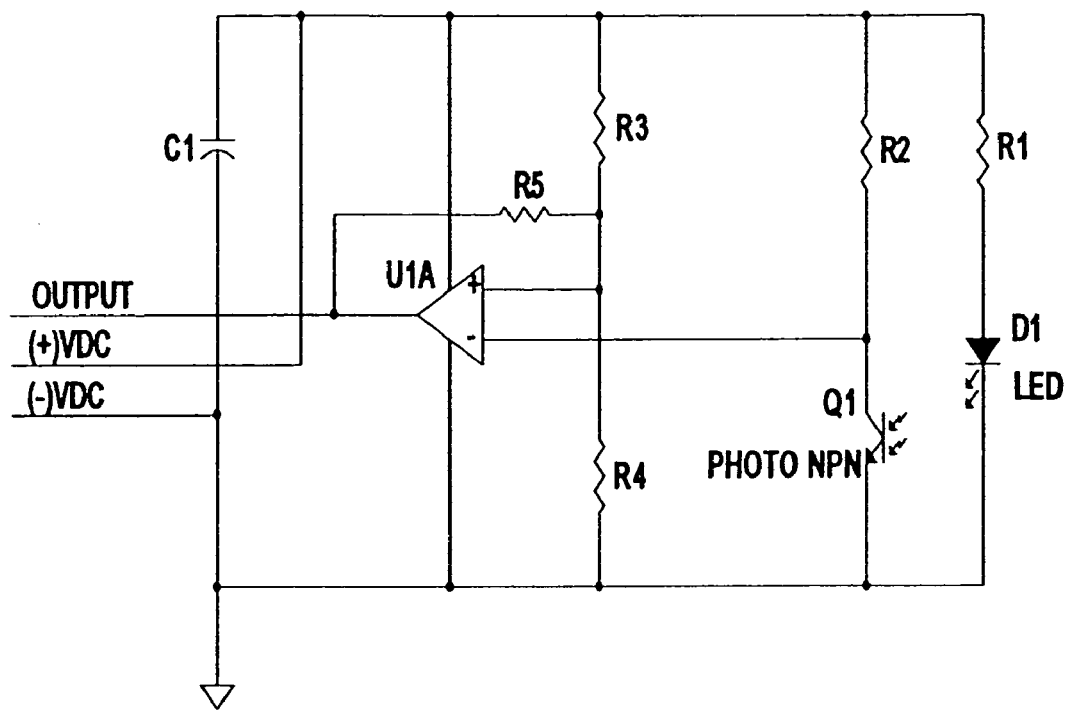
FIG. 21 is a schematic of an exemplary electric circuit that can be used in conjunction with the sensor assembly in FIGS. 16–18 for sensing the presence of liquid.
Figure 22:
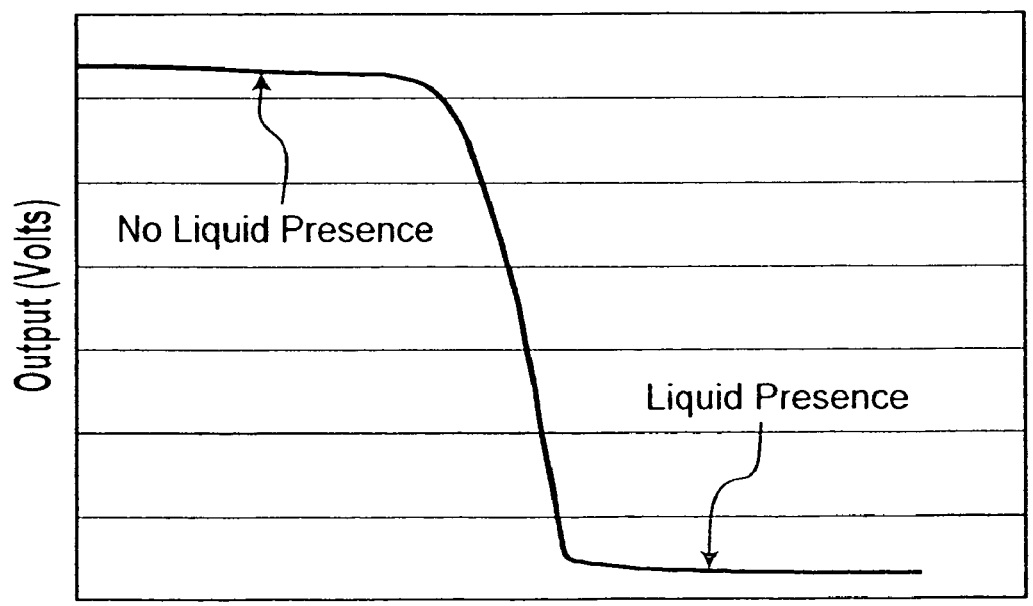
FIG. 22 is a graph illustrating output from the electric circuit of FIG. 21.

FIGS. 21 and 22 show an example of sensing an electronic circuit and its output for the sensor assembly 130. With no ink presence in the light path in the reservoir 42, the light detector Q1 receives light from the LED emitter D1, bringing the "−" pin on the comparator U1A to low voltage. Therefore, the OUTPUT voltage from the comparator U1A is high, see FIG. 22. With ink presence in the light path in the reservoir 42, the photo sensor Q1 receives no light from the LED emitter D1. This brings the voltage at "−" of the comparator higher than the reference voltage so that the comparator gives a low OUTPUT voltage. The magnitude of voltage output is determined by input voltage (+)VDC in the circuit.

Referring back to FIG. 15, the ink level in the ink reservoir 42 is tightly controlled during printing through the substantially continuous ink filling from the ink container 40 due to gravity. The large volume of ink held by the ink container 40 ensures non-stop printing within a plot or a series of plots. When the ink container 40 is about completely depleted, the ink level 124 in the ink reservoir 42 starts to subside. When the ink level 124 goes below the plane of the light emitter 136 and the light detector 138, the sensor assembly 130 detects a low ink level state, and the printer 2 will signal a warning that the ink container 40 is out of ink and needs to be replaced. If the ink container 40 is not replaced within a predetermined amount of printing, printer 2 will stop printing to avoid catastrophic print cartridge or image printing failure.

Fluid Connection from Ink Supply to Print Cartridge

For an inkjet printer 2 with an off-carriage ink delivery system, the dynamic back pressure in the print cartridge 24 is dependent on the static pressure provided by the ink level 124 in the ink reservoir 42, the viscous ink flow from the reservoir 42 to the print cartridge 24, and the movement of the carriage 14. As shown in FIG. 3, the connection components from the ink reservoir 42 to the print cartridge 24 include the flexible tubing 64, the pulsation dampener 66, the flexible tubing 68, and the septum port 28. First, the inside diameter and length of the flexible tubing 64, 68 plays an important role for the viscous pressure drop from the ink reservoir 42 to the print cartridge 24, and needs to be selected according to ink flow rate, ink viscosity, printer width, etc. The viscous pressure drop in the flexible tubing 64, 68 is combined with the static pressure provided by the ink level 124 in the ink reservoir 42 to determine the dynamic pressure at the print cartridge 24. During printing when ink droplets are ejected from the print head 34 onto media to form image, an ink flow is drawn from the ink reservoir 42. At steady state flow, the viscous pressure drop in flexible tubing 64, 68 can be expressed as $$\Delta P = f \frac{L}{d} \frac{V^2}{2g}$$

where ΔP is pressure drop, f is the Darcy friction factor which is proportional to viscosity μ for laminar flow, L is the length of flexible tubing 64, 68, d is the inner diameter (ID) of the flexible tubing 64, 68, V is the velocity of the ink flowing in the flexible tubing 64, 68, and g is the gravitational acceleration. Though the ink flow in the flexible tubing 64, 68 is not considered steady state due to the variable ink consumption rate at the print head 34, the above equation can qualitatively guide tubing size selection. As indicated by the equation, the pressure loss ΔP increases with ink viscosity μ, ink flow rate which is a function of ink velocity V, and tubing length L, and decreases with an increase in tubing ID d. The ink viscosity is determined by the ink formulation, which is designed primarily for optimal image quality, and is typically in the range of 1.2–3.5 cP, but can vary from 1 to 10 cP. The ink viscosity can be adjusted for optimal viscous pressure drop ΔP in the ink delivery system, but it is not recommended. The ink flow rate is determined by the printer throughput, which is related to the number of nozzles on the print head 34 and the drop volume of the ink droplets ejected from the nozzles, as well as the printing density of the image being printed. Therefore, the ink flow rate can vary significantly due to the factors involved. For a print head 34 having 640 nozzles and with an individual drop volume of about 25 pico-liter, such as the print head on the Lexmark print cartridge, Part No. 18L0032, the ink flow rate varies between about 0.5 to about 2.0 ml/minute for typical image printing, and may vary in the range of 0–8 ml/minute. The decisive factor for length of flexible tubing 64, 68 is the printer width. For a printer 2 capable of printing on 60 inch wide media, for example, the length of flexible tubing 64, 68 varies from 120 to 170 inches, while for printer 2 capable of printing on 42 inch wide media the length of flexible tubing 64, 68 varies from 100 to 150 inches. Therefore, among the influencing factors of viscous pressure drop, tubing ID is the only factor that lends itself to be actively selected for pressure drop adjustment.

It is desirable that the pressure drop ΔP between the ink reservoir 42 and the print head 34 is minimized so that the back pressure mainly depends on the ink level 124 in the ink reservoir 42. A larger tubing ID can be selected for small ΔP. However, the larger tubing ID leads to a greater moving ink mass in the flexible tubing 64, 68, which requires more robust printer and carriage structure and is therefore undesirable. A more important factor is related to the carriage movement. Referring to FIGS. 2 and 3, the ink tubing 64 is carried in a hollow chain (not shown), which is rigidly attached at one end to the printer frame and pivotally attached to the carriage 14 at the other end. When the tubing 64 is threaded through the interior of such a chain, it is constrained to bend only in the same manner as the chain. Such a chain is known to those in the art, and is available from companies such as Igus in Germany. During printing when the carriage 14 moves in one direction, it pulls the chain and the tubing 64 inside the chain along. When the carriage 14 travels back and forth at a predetermined speed for image printing, the carriage 14 needs to slow down in one direction to zero speed and immediately speed up in the reverse direction to the same speed to continue the image printing. The carriage 14 turnaround from one direction to the reverse direction typically has an acceleration of up to 1.5 G for a predetermined carriage speed of about 40 to 60 inches per second. Since the tubing 64 is connected to the print cartridge 24 which is supported on the carriage 14, the acceleration at the carriage turnaround exerts a force on the ink traveling in the tubing 64, causing the ink to accelerate in the direction of the force. Further, the force acting on the ink in the tubing 64 at the left side turnaround is opposite to the force acting on the ink in the tubing 64 at the right side turn around. Therefore, these forces accelerate the ink in opposing directions causing the ink to slosh in the tubing 64. The ink sloshing due to the carriage turnaround causes back pressure variation in the print cartridge 24. The larger the tubing ID the greater the range of back pressure variation due to a smaller viscous pressure drop or a decrease in dampening effect. Due to the asymmetrical left hand side and right hand side design of the printer 2 and the asymmetrical chain attachment to the carriage 14, the ink sloshing usually results in a net ink flow into the print cartridge 24, causing increased pressure in the print cartridge 24 or a "pumping effect". Therefore, to reduce the pressure variation or the pumping effect due to the carriage turnaround, smaller tubing ID is preferred, which is contrary to the decision based on the viscous pressure drop consideration. Typically, tubing ID in a wide format inkjet printer ranges from 1/32 inch to 1/4 inch. Tubing ID is a compromise between bigger tubing for less viscous pressure drop and smaller tubing for better dampening of pressure variation. As an example, for ink having viscosity in the range of 1.2–3.5 cP, ink flow rate in the range of 0–8 ml/min., carriage speed as high as 40–60 inch per second and the printer width 40–60 inch, the tubing ID can be selected in the range 1/16–1/8 inch.

The pressure variation caused by the carriage turnaround during printing can be suppressed by connecting a fluid pulsation dampener 66 to the flexible tubing 64, 68. In FIG. 3, a pulsation dampener 66 is serially connected to the tubing 64 at one end and to the tubing 68 at the other end, which is further connected to the septum port 28 to interface the print cartridge 24. The pulsation dampener 66 is preferably supported on the carriage 14 proximate to the print cartridge 24, but can be located anywhere between the ink reservoir 42 and the print cartridge 24. For example, the pulsation dampener 66 may be positioned in the left side housing 4 in proximity to the ink reservoir.

Figure 23:
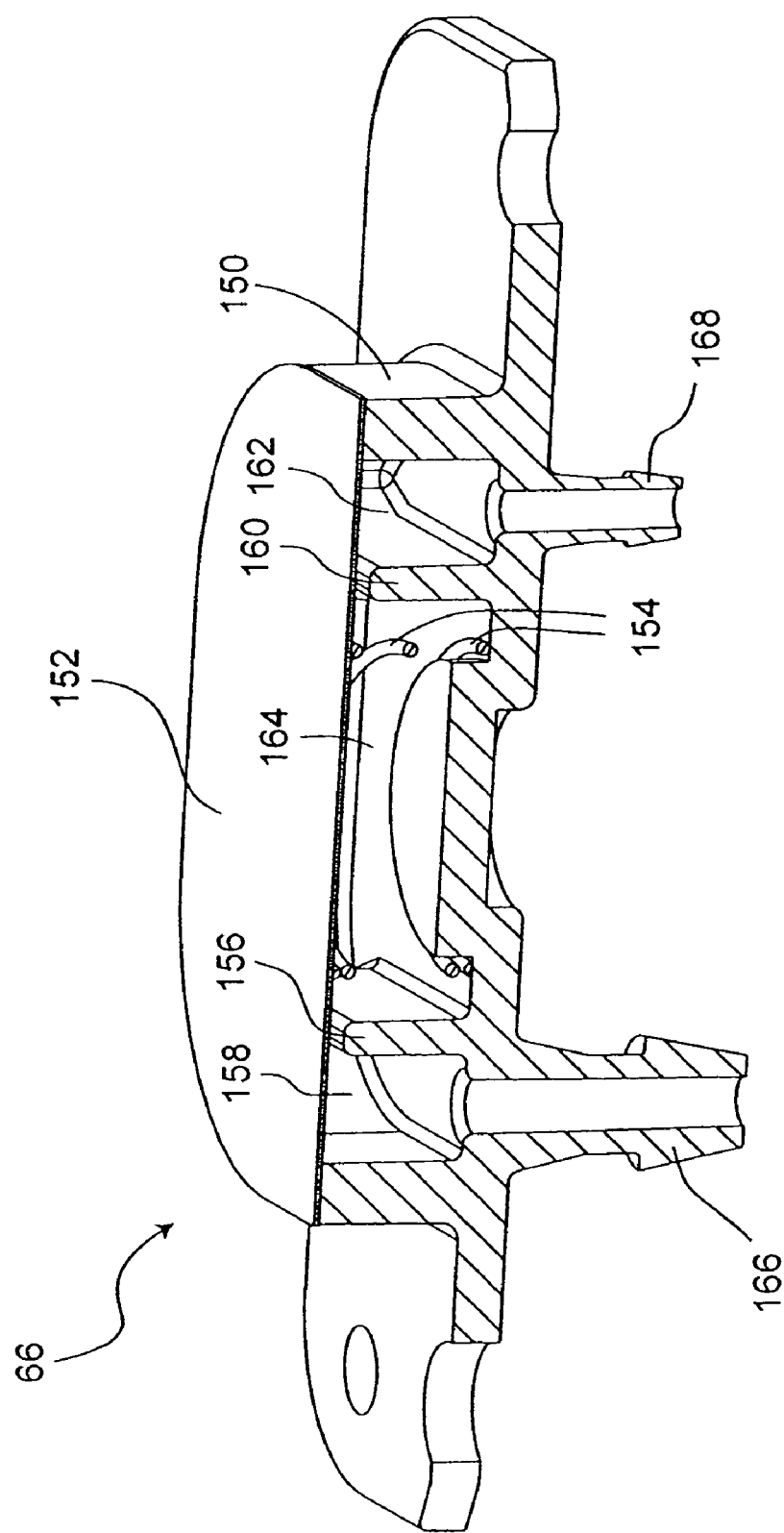
FIG. 23 is a perspective cross-sectional view of a pulsation dampener.

Details of the pulsation dampener 66 are shown in FIG. 23. The pulsation dampener 66 includes a body 150, a flexible membrane 152 hermetically attached to the body 150. Body 150 includes an ink inlet chamber 79, a central chamber 164, and an ink outlet chamber 162. Body 150 is preferably molded or machined using high-density polyethylene or other polymeric materials. In a preferred embodiment, the membrane 152 is protruded to have multiple layers of the same material, preferably high-density polyethylene or polyester, with each layer taking a different molecular or fibril orientation. Such a multi-layer structure has improved mechanical stretch and better elastic property after being attached to the body 150. Alternatively, membrane 152 may have a multi-layer structure with a different material used for at least one of the layers for improved gas impermeability. The thickness of membrane 152 can range from 0.002 to 0.004 inch, but can be thinner or thicker depending on the dampener design and requirements. Preferably, the membrane 152 is attached to the body 150 by means of thermal welding to provide a hermetical seal between the membrane and the body. After the welding process, the membrane shrinks to create a uniform tension therein. An ink inlet barb 166 projects from the inlet chamber 158 and an ink outlet barb 168 projects from the outlet chamber 162 of the body 150. The inlet chamber 158 is separated from the central chamber 164 by weir 156 and the outlet chamber 162 is separated from the central chamber 164 by weir 160. Ink flowing through dampener 66 enters the inlet chamber 158 through the inlet barb 166 and flows over weir 156 into the central chamber 164. Ink then flows from the central chamber 164 over weir 160 into the outlet chamber 162 and exits dampener 66 via the outlet barb 168. When ink enters into the inlet chamber 158, it impinges on the flexible and elastic membrane to cause the membrane to stretch. During a pressure peak, part of the kinetic energy of the influx ink is absorbed and stored by the elastic membrane, suppressing the pressure peak of a pressure variation cycle. The ink then changes direction to flow through the gap between membrane 152 and weir 156 to enter the central chamber 164. Such a design of dampener 66 is advantageous because the membrane 152 traverses inlet chamber 158, central chamber 164 and outlet chamber 162 and is not affixed to either weir 156, 160. Therefore, the extra energy of the pressure peak gets stored by the entire membrane 152. The stored energy in the stretched membrane at pressure peak can be released to the ink at the subsequent pressure valley when the membrane 152 returns to a normally planar configuration, thus resulting in reduced range of fluid pressure variation. The dampening effect of the pulsation dampener 66 can be enhanced with an optional compression spring 154 in the central chamber 164 to increase the elastic behavior of the membrane 152.

Figure 24:
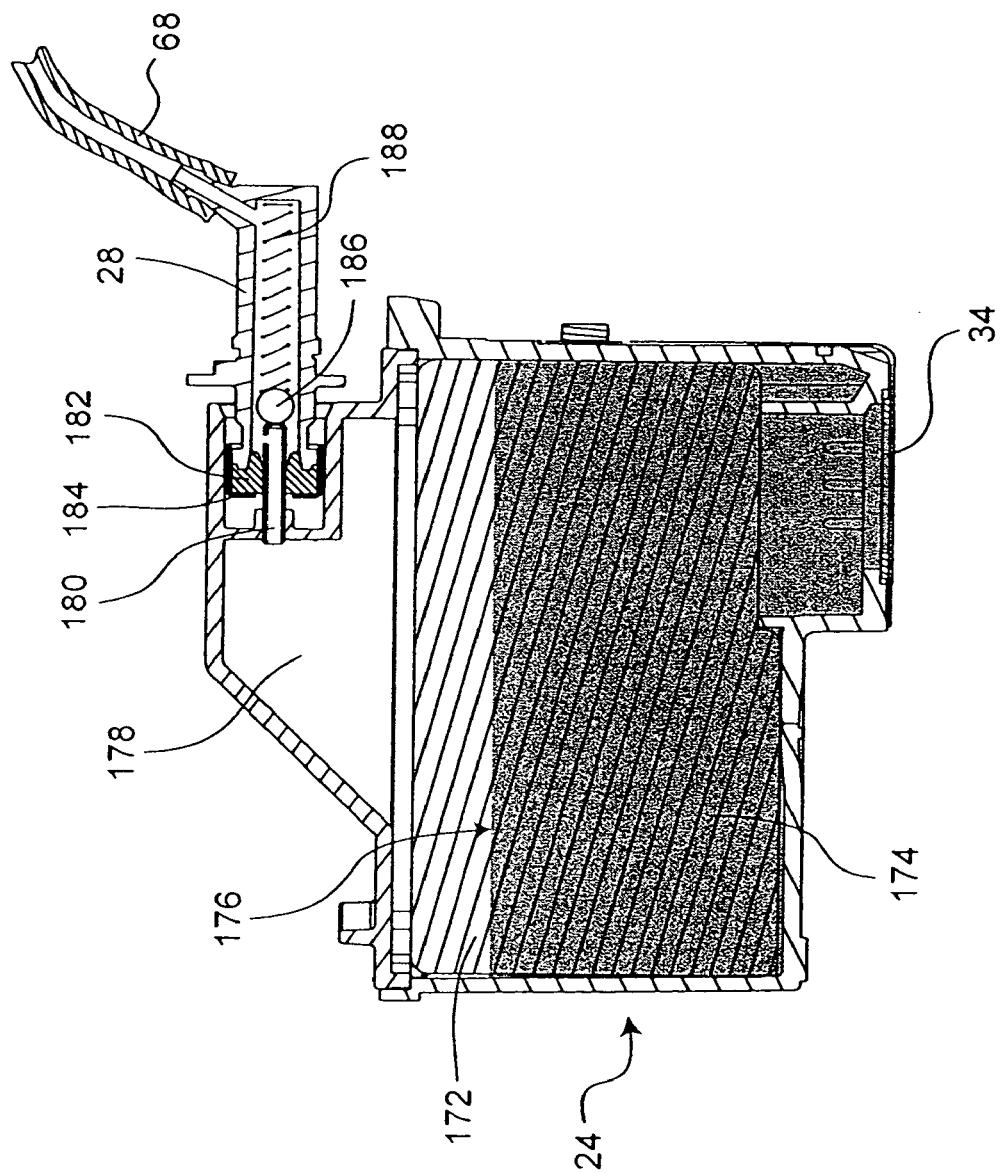
FIG. 24 is a cross-sectional view of a print cartridge engaged with a septum port.

Referring to FIG. 24, the print cartridge 24 is connected to the septum port 28 and contains an ink-absorbent porous foam 172. The print cartridge 24 is initially processed in factory to be filled with ink 174 and primed through nozzles on print head 34 to ensure proper print head performance. The initial ink level 176 in cartridge is controlled by the ink filling and priming process to be below the top surface of the porous foam 172 to establish a predetermined back pressure in the print cartridge 24 due to the capillary effect of the foam 172 on the ink 174. Upon installation into the carriage 14 (FIG. 2), the print cartridge 24 establishes fluid connection to the septum port 28, which includes an elastomeric rubber septum 182, a metal cap 184, a ball valve 186 and a compression spring 188. Compared with the septum channels 88, 90 on the cap 82 of the ink container 40, the septum port 28 further includes a ball valve 186 and a compression spring 188 for more secured sealing. When the septum port 28 is not engaged with the conduit needle 180 in the print cartridge, the compression spring 188 pushes the ball valve against the rubber septum to form a seal in addition to the seal by the normally closed slit septum. Since the septum port is a permanent part in the printer, the ball valve and the compression spring functions to prevent ink leaking even when the slit of the septum is worn and enlarged after considerable times of needle insertions.

When the print cartridge 24 is connected to the septum port 28, a direct fluid communication is established between the ink in the ink reservoir 42 at the ink supply station 108 and the ink in the print cartridge 24. During printing, when ink droplets are ejected from nozzles on the print head 34, ink flows from the ink reservoir 42 through tubing 64, dampener 66, tubing 68, and septum port 28, into the conduit needle 180. From there, ink drips into the air gap 178 and on top of the porous ink absorbent foam 172 and is absorbed into it. In this way, a substantially continuous ink refill from the ink reservoir 42 to the print cartridge 24 is established. The foam 172 and the air gap 178 provide extra static back pressure which affects the vertical positioning of the ink reservoir 42 in the design of the system, and provides a cushion to help dampen the pressure variation. The preferred embodiment of the print cartridge 24 has foam 172 which is partially filled with ink to provide an extra static back pressure of 2–4 inch $H_2O$, and the ink reservoir 42 may be vertically positioned so that the ink level in the reservoir 42 is about 0–6 inches below the print head 34. Alternatively, the print cartridge 24 may contain no foam and include an air gap 178 residing directly above the ink. In such case the air gap 178 provides extra back pressure, which is equal to the vertical distance from the conduit needle to the ink level 176 in the cartridge, and provides a cushion to dampen pressure variation through air gap compressible volumetric change, with the ink reservoir 42 being vertically positioned so that the ink level in the reservoir is about 2–8 inches below the print head 34.

In summary, the dynamic back pressure in the print cartridge 24 during printing is determined by the static back pressure, the viscous pressure drop due to ink flow from the ink reservoir 42 to the print cartridge 24, and the pressure variation caused by the turn-around of the carriage 14. The static pressure is determined by the height of the ink level 124 in the ink reservoir 42 and the configuration of the print cartridge 24 including the presence of the ink absorbent foam 172 and the air gap 178. The viscous pressure drop has many contributors and can be actively adjusted by selecting the tubing diameter d. The pressure variation caused by carriage turnaround can be controlled by the tubing diameter selection, and by adding a pulsation dampener 66.

Figure 25:
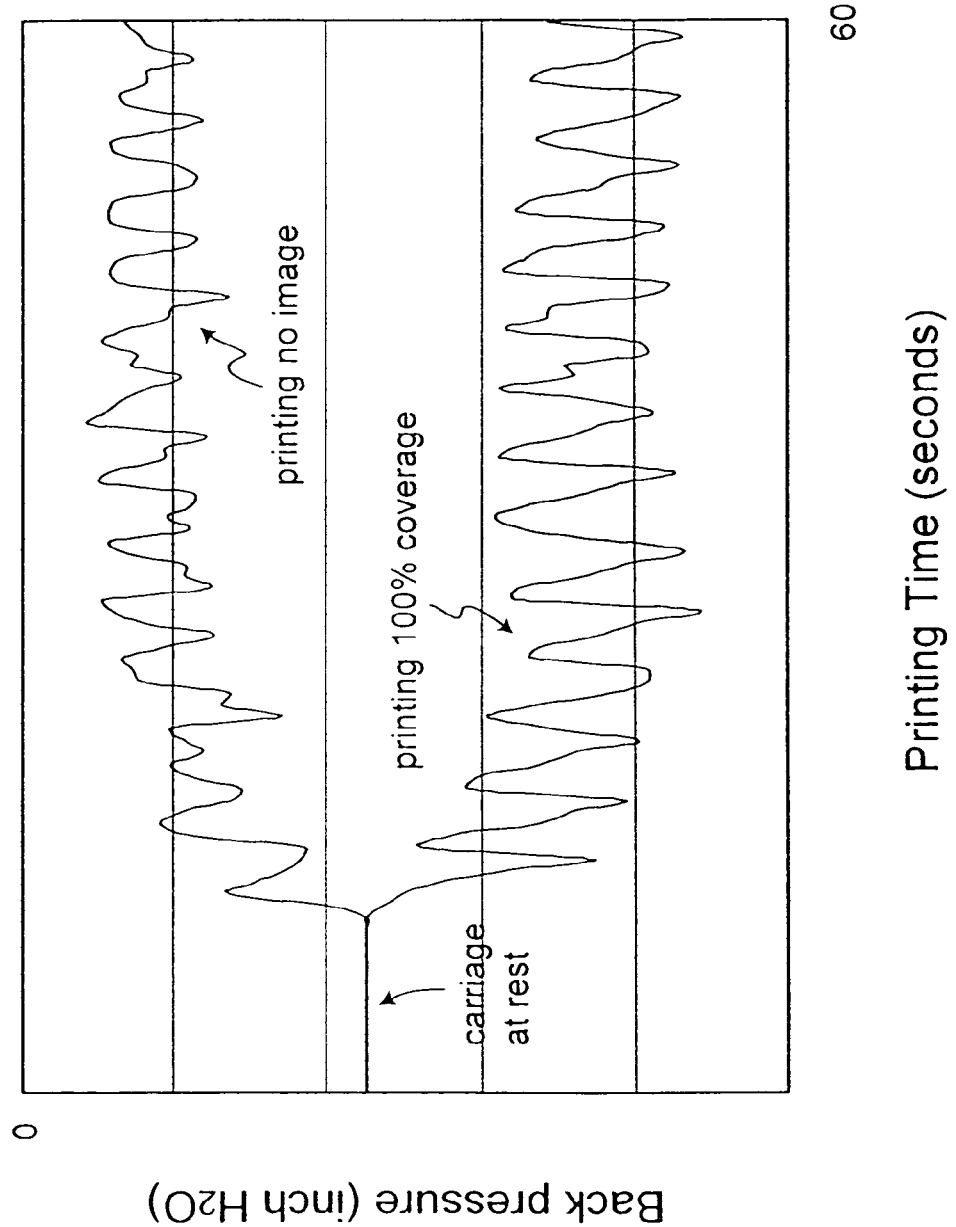
FIG. 25 is a graph of back pressure changing with time taken with a preferred embodiment of the ink delivery system.

FIG. 25 shows back pressure curves recorded in a 60 inch wide format inkjet printer, having a print head with 640 nozzles, with the ink delivery system of the present invention, for no image printing and printing 100% single color area coverage at bi-directional three-pass. The ink container 40 and the ink reservoir 42 were vertically positioned so that the ink level 124 in the ink reservoir 42 was about 1 inch below the print head 34 attached to the print cartridge 24. The ink reservoir 42 was serially connected to a 130 inch long flexible tubing 64 with 3/32 inch ID, a pulsation dampener 66, a 4 inches long flexible tubing 68 with 1/16 inch ID, a septum port 28, and a print cartridge 24 containing ink absorbent foam 172. With no image printing the ink sloshing in the flexible tubing 64 due to the carriage turnaround caused mean back pressure to rise by about 3 inches $H_2O$, while with 100% coverage printing at bi-directional 3 pass, the mean back pressure dropped by about 3 inches $H_2O$ because of viscous pressure drop in the flexible tubing 64. In both cases, there were back pressure variations, one complete cycle of back pressure variation for each complete left-to-right and right-to-left carriage movement. The back pressure variation amplitude was as large as about 2 inches $H_2O$. As explained previously, changing tubing ID will dramatically change the curve shapes for both the mean pressure change and the pressure variation amplitude of the curves. For example, it was observed during experimentation that bigger tubing ID and no pulsation dampener substantially reduced the pressure rise due to the carriage turnaround, and the pressure drop due to the viscous flow in tubing 64, but increased the amplitude of pressure variation to as much as 8 inches $H_2O$. The benefit of the pulsation dampener 66 is the reduced pressure variation amplitude without affecting the mean pressure rise or drop significantly. Therefore, to deliver back pressure to the print head 34 in an acceptable range, every important component of the ink delivery system should be evaluated.

It is understood that the above-described embodiments are merely illustrative of the possible specific embodiments which may represent principles of the present invention. Other arrangements may readily be devised in accordance with these principles by those skilled in the art without departing from the scope and spirit of the invention.

PARTS LIST 2. printer
4. left side housing
6. right side housing
8. legs
10. display with keypad
12. air blower
14. carriage
16. scanning direction
18. guiding shaft
20. media roll holder
22. cartridge stall
24. print cartridge
26. cartridge door
28. septum port
30. bushing
32. carriage cover
34. print head
40. ink container
42. ink reservoir
44. air shroud
46. air conduit needle
48. ink shroud
50. ink conduit needle
52. snap-fit receptacle
54. container chip reader
58. ink barb
60. air barb
62. mounting bus
64. flexible tubing
66. pulsation dampener
68. flexible tubing
70. reservoir housing
72. reservoir cover
74. top surface
76. indented ring
78. threaded neck
79. inlet chamger
80. bottle
81. cavity
82. cap
84. color indicator ring
85. key
86. memory chip assembly
88. air inlet channel
89. air channel tubular support
90. ink exit channel
91. ink channel tubular support
92. projection
93. counter bore
94. ring locator
95. teeth on color indicator ring
96. rubber septum
97. cut-out on cap
98. metal cap
100. O-ring
102. receptacle
104. groove
106. ink supply base
108. ink supply station
109. ink station wall
110. ink
112. air pocket
113. triangular sloped openings
114. air entrance opening
115. shared walls
116. air guide tube
124. ink level
126. air gap
128. screws
129. screws
130. sensor assembly
132. mounting bracket
133. wall sections
134. protruding portion
135. wall sections
136. light emitter
138. light detector
140. sensor housing
142. circuit board member
144. first refracted path
146. second refracted path
148. emitter pins
149. detector pins
150. dampener body
152. membrane
154. compression spring
156. inlet weir
158. inlet chamber
160. exit weir
162. outlet chamber
164. central chamber
166. inlet barb
168. outlet barb
172. foam
174. ink
176. ink level in cartridge
178. air gap
180. conduit needle
182. rubber septum
184. metal cap
186. ball valve
188. compression spring

The invention claimed is:

1. A sensing system for detecting the presence of liquid at a predetermined level comprising:
a reservoir including a first wall section and a second wall section forming an angle with the first wall section, wherein at least a portion of the first wall section and a portion of the second wall section are substantially transmissive to light;
a light emitter located proximate to the first wall section and positioned at the predetermined level;
a photo detector positioned at the predetermined level and located proximate to the second wall section for detecting the light emitted from the light emitter, the light emitter being oriented to direct light through said first and second wall sections toward the photodetector, the light from the light emitter following a first path through said first and second wall sections when liquid is present in the reservoir at the predetermined level and following a second path through said first and second wall sections when liquid is not present in the reservoir at the predetermined level, the photodetector receiving the light from the light emitter traveling only one of the first path or the second path.

2. A sensing system for detecting the presence of liquid at a predetermined level comprising:
a reservoir including a perimetric wall including a first wall section and a second wall section, wherein at least a portion of the first wall section and a portion of the second wall section are substantially transmissive to light;
a light emitter located proximate to the first wall section and positioned at the predetermined level;
a photo detector positioned at the predetermined level and located proximate to the second wall section for detecting the light emitted from the light emitter, the light emitter being oriented to direct light through said first and second wall sections toward the photodetector, the light from the light emitter following a first path through said first and second wall sections when liquid is present in the reservoir at the predetermined level and following a second path through said first and second wall sections when liquid is not present in the reservoir at the predetermined level, the photodetector receiving the light from the light emitter traveling only one of the first path or the second path.

3. A sensing system as recited in claim 2 wherein:
the perimetric wall is arcuate.

4. A sensing system as recited in claim 2 wherein:
the perimetric wall is polygonal.

5. A sensing system as recited in claim 2 wherein:
the first wall section and the second wall section form a protruding portion of the reservoir.

6. A sensing system as recited in claim 5 wherein:
the protruding portion is shaped as a convexity.

7. A sensing system as recited in claim 5 wherein:
the protruding portion is a corner of the reservoir.

8. A sensing system as recited in claim 5 wherein:
the protruding portion is formed integrally with the reservoir.

9. A sensing system as recited in claim 2 wherein:
the first path being determined by the light from the emitter refracting at an interface of the wall potions and the liquid in the reservoir when the liquid is present at the predetermined level; and
the second path being determined by the light from the emitter refracting at an interface of the wall potions and air in the reservoir when the liquid is not present at the predetermined level.

10. A sensing system as recited in claim 2 wherein:
the first path and the second path are determined by the a refractive index of the liquid and a refractive index of air, respectively.

11. A sensing system as recited in claim 2 wherein:
the photodetector and the light emitter are mounted in a sensor housing adapted to locate the light emitter adjacent to the first wall portion and the photodetector adjacent to the second wall portion.

12. A sensing system as recited in claim 11 wherein:
the sensor housing is integrally formed.

13. A sensing system as recited in claim 2 wherein:
the first wall portion and the second wall portion intersect.

14. A sensing system as recited in claim 2 wherein:
the first wall portion and the second wall portion intersect at an obtuse angle.

15. A sensing system for detecting the presence of liquid at a predetermined level comprising:
a reservoir including a perimetric wall including a first wall section and a second wall section, wherein at least a portion of the first wall section and a portion of the second wall section are substantially transmissive to light, wherein the first wall portion and the second wall portion intersect at an acute angle;
a light emitter located proximate to the first wall section and positioned at the predetermined level;
a photo detector positioned at the predetermined level and located proximate to the second wall section for detecting the light emitted from the light emitter, the light emitter being oriented to direct light through said first and second wall sections toward the photodetector, the light from the light emitter following a first path through said first and second wall sections when liquid is present in the reservoir at the predetermined level and following a second path through said first and second wall sections when liquid is not present in the reservoir at the predetermined level, the photodetector receiving the light from the light emitter traveling only one of the first path or the second path.

16. A sensing system for detecting the presence of ink at a predetermined level in an ink reservoir for an ink jet printer comprising:
a perimetric wall formed as part of the reservoir, the perimetric wall including a first wall section and a second wall section, wherein at least a portion of the first wall section and a portion of the second wall section are substantially transmissive to light;
a light emitter located proximate to the first wall section and positioned at the predetermined level;
a photo detector positioned at the predetermined level and located proximate to the second wall section for detecting the light emitted from the light emitter, the light emitter being oriented to direct light through said first and second wall sections toward the photodetector, the light from the light emitter following a first path through said first and second wall sections when ink is present in the reservoir at the predetermined level and following a second path through said first and second wall sections when ink is not present in the reservoir at the predetermined level, the photodetector receiving the light from the light emitter traveling only one of the first path or the second path.

17. A sensing system as recited in claim 16 wherein:
the perimetric wall is arcuate.

18. A sensing system as recited in claim 16 wherein:
the perimetric wall is polygonal.

19. A sensing system as recited in claim 16 wherein:
the light emitter and photodetector are positioned proximate to a protruding portion of the reservoir.

20. A sensing system as recited in claim 19 wherein:
the protruding portion is shaped as a convexity.

21. A sensing system as recited in claim 19 wherein:
the protruding portion is a corner of the reservoir.

22. A sensing system as recited in claim 19 wherein:
the protruding portion is formed integrally with the reservoir.

23. A sensing system as recited in claim 16 wherein:
the first path being determined by the light from the emitter refracting at an interface of the wall portions and the ink in the reservoir when the ink is present at the predetermined level; and the second path being determined by the light from the emitter refracting at an interface of the wall portions and air in the reservoir when the ink is not present at the predetermined level.

24. A sensing system as recited in claim 16 wherein:

the first path and the second path are determined by the a refractive index of the ink and a refractive index of air, respectively.

25. A sensing system as recited in claim 16 wherein:

the photodetector and the light emitter are mounted in a sensor housing adapted to locate the light emitter adjacent to the first wall portion and the photodetector adjacent to the second wall portion.

26. A method for detecting the presence of liquid at a predetermined level in a liquid reservoir comprising:

positioning a light emitter at the predetermined level proximate to a first wall section of the reservoir;

positioning a photodetector at the predetermined level proximate to a second wall section; and emitting a beam of light from the light emitter through the first wall section, the beam of light from the light emitter following a first path through said second wall section when liquid is present in the reservoir at the predetermined level and following a second path through said second wall section when liquid is not present in the reservoir at the predetermined level, the photodetector receiving the light from the light emitter traveling only one of the first path or the second path.

27. A method as recited in claim 26 wherein:

the first path is determined by the light from the emitter refracting at an interface of the wall portions and the liquid in the reservoir when the liquid is present at the predetermined level; and the second path is determined by the light from the emitter refracting at an interface of the wall portions and air in the reservoir when the liquid is not present at the predetermined level.

28. A method as recited in claim 26 wherein:

the first path and the second path are determined by the a refractive index of liquid and a refractive index of air, respectively.

* * * * *